United States Patent
Chan et al.

(10) Patent No.: US 10,744,555 B2
(45) Date of Patent: Aug. 18, 2020

(54) STACKABLE COLLAR CARTRIDGES FOR SWAGE TOOLS

(71) Applicant: The Boeing Company, Chicago, IL (US)

(72) Inventors: Kwok Tung Chan, Seattle, WA (US); Tanni Sisco, Mukilteo, WA (US); Eric M. Reid, Kenmore, WA (US); Jeff Devlin, Seattle, WA (US); Brendan Elmore, Seattle, WA (US)

(73) Assignee: The Boeing Company, Chicago, IL (US)

( * ) Notice: Subject to any disclaimer, the term of this patent is extended or adjusted under 35 U.S.C. 154(b) by 148 days.

(21) Appl. No.: 16/140,154

(22) Filed: Sep. 24, 2018

(65) Prior Publication Data

US 2020/0094311 A1 Mar. 26, 2020

(51) Int. Cl.
*B21J 15/32* (2006.01)
*B21J 15/10* (2006.01)
*B21J 15/02* (2006.01)

(52) U.S. Cl.
CPC .............. *B21J 15/32* (2013.01); *B21J 15/022* (2013.01); *B21J 15/105* (2013.01)

(58) Field of Classification Search
CPC ........ B21J 15/022; B21J 15/105; B21J 15/12; B21J 15/32; B21J 15/38
See application file for complete search history.

(56) References Cited

PUBLICATIONS

U.S. Appl. No. 15/923,297.
U.S. Appl. No. 15/923,378.
U.S. Appl. No. 15/963,148.
Virbation motor; Jameco Electronics; https://www.jameco.com/shop/StoreCatalog; Aug. 22, 2018.

*Primary Examiner* — Nathaniel C Chukwurah
(74) *Attorney, Agent, or Firm* — Duft & Bornsen, PC

(57) ABSTRACT

Systems and methods are provided for assembling a magazine for a swage tool. The method includes selecting a cartridge that comprises a first serpentine channel dimensioned for conveying collars, and further comprises an entrance and an exit of the first serpentine channel. The method also includes disposing the cartridge at a swage tool.

20 Claims, 21 Drawing Sheets

FIG. 11
FIG. 12
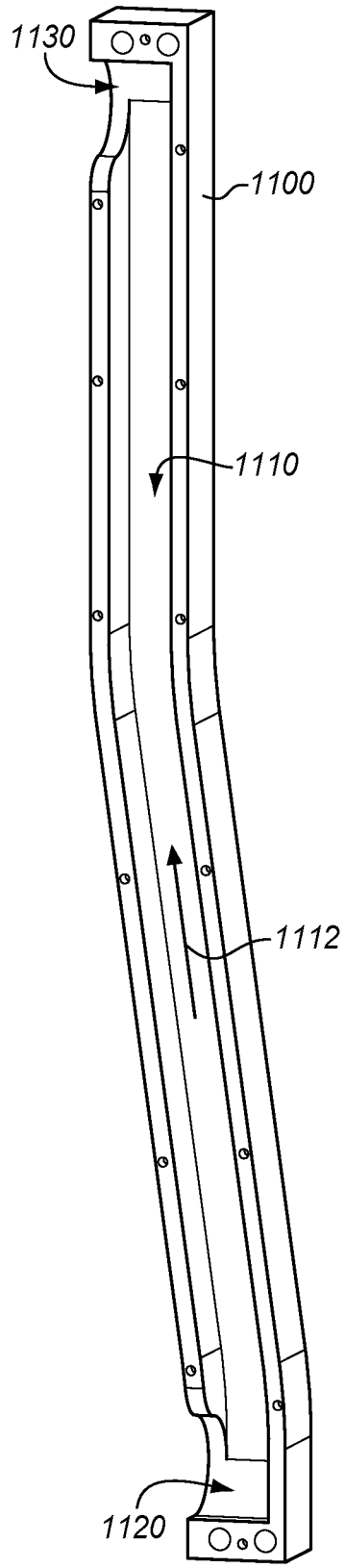
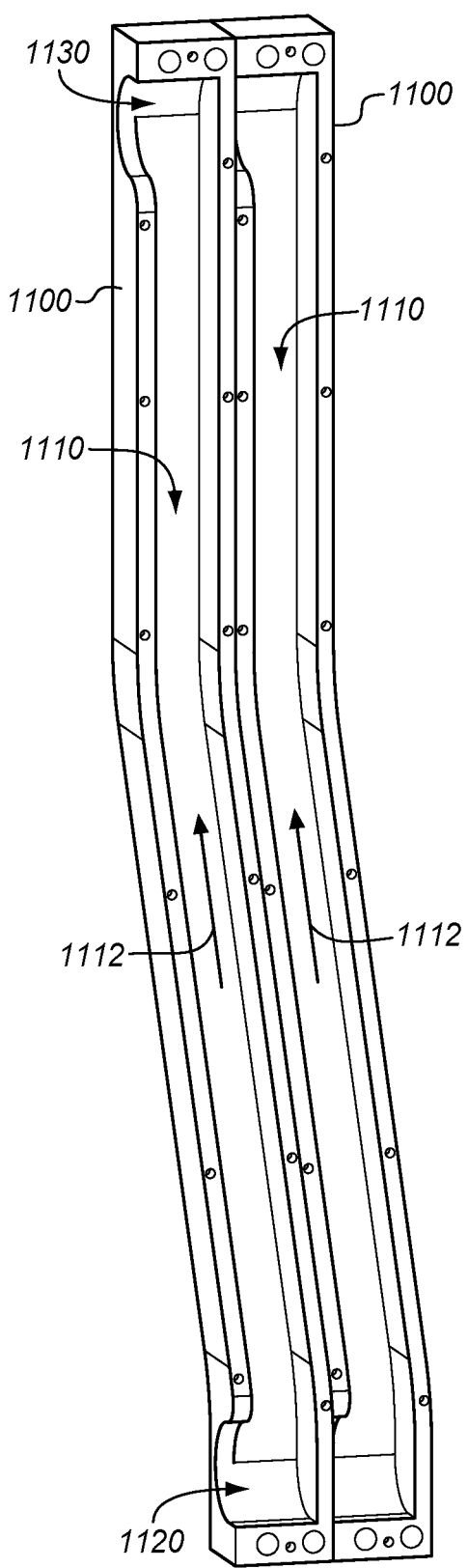

COLLAR FLIP DEVICE

US 10,744,555 B2

STACKABLE COLLAR CARTRIDGES FOR SWAGE TOOLS

FIELD

The disclosure relates to the field of fabrication, and in particular, to swage tools which fasten parts together.

BACKGROUND

The number of fasteners (e.g., bolts) used to assemble aircraft can be astronomical. For example, a midsize commercial jetliner can have several million fasteners that are installed to join different parts together.

The time needed to install fasteners may be greater than desired. For example, swage tools which install fasteners may need to be reloaded with collars for lockbolts on a regular basis, and the amount of collars needed for each "run" of a swage tool across an aircraft may vary. Thus, time is either wasted by loading too many collars or too few collars onto a swaging tool. Additionally, if too many collars or too few collars are loaded onto a swaging tool, there is the potential for a collar to jam, which results in a halt in fabrication of the aircraft. Collars may even jam in their feeding systems, and feeding systems may have more components or otherwise occupy more space than desired on the factory floor.

Therefore, it would be desirable to have a method and apparatus that take into account at least some of the issues discussed above, as well as other possible issues. For example, it would be desirable to have a method and apparatus that overcome a technical problem with automating the installation of fasteners.

SUMMARY

Embodiments described herein provide collar delivery systems for swage tools that install fasteners. The collar delivery systems include cartridges that are modular and capable of being stacked together to form a magazine of any desired size. Enabling magazines of custom sizes to be rapidly assembled reduces the number of times that a swage tool is either over- or under-loaded when performing a fabrication process. This in turn reduces labor associated with loading swage tools.

One embodiment is a method for assembling a magazine for a swage tool. The method includes selecting a cartridge that comprises a first serpentine channel dimensioned for conveying collars, and further comprises an entrance and an exit of the first serpentine channel. The method also includes disposing the cartridge at a swage tool.

A further embodiment is a non-transitory computer readable medium embodying programmed instructions which, when executed by a processor, are operable for performing a method for assembling a collar delivery device for a swage tool. The method includes selecting a cartridge that comprises a first serpentine channel dimensioned for conveying collars, and further comprises an entrance and an exit of the first serpentine channel. The method also includes disposing the cartridge at a swage tool.

A further embodiment is an apparatus for delivering collars to a swage tool. The apparatus includes a first cartridge that comprises a first serpentine channel dimensioned for conveying collars, and that further comprises an entrance and an exit of the first serpentine channel. The apparatus further includes a collar injector that delivers collars from the first serpentine channel passageway one at a time to the swage tool.

A further embodiment is a method for managing collar delivery to a tool. The method includes progressing a collar through a continuous passageway defined by a cartridge within a magazine having a first capacity, wherein a circumferential flange of the collar overlaps a circumferential flange of another collar within the continuous passageway, and an orientation of the circumferential flange with respect to the cartridge remains unchanged while the collar progresses through the continuous passageway. The method also includes transitioning the collar from the cartridge to another cartridge within the magazine via a rigid connector, delivering the collar from the magazine to the tool via a collar injector, and adjusting a capacity of the magazine by adjusting a number of cartridges within the magazine.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 11 is a back view of a connector for a magazine in accordance with an illustrative embodiment.

FIG. 12 is a back view of two adjacent connectors for a magazine in accordance with an illustrative embodiment.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The illustrative embodiments recognize and take into account one or more different considerations. For example, the illustrative embodiments recognize and take into account that fasteners may be installed in holes located under overhangs in a structure. The illustrative embodiments recognize and take into account that swage tools may be over- or under-loaded with lockbolt collars, resulting in wasted labor related to reloading the swage tools. Thus, the illustrative embodiments provide a method, an apparatus, and a system for loading collars for swage tools.

When one component is "connected" with another component, the connection is a physical association. For example, a first component, such as a collar installer, may be considered to be physically connected to a second component, such as a platform, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically connected to the second component by being formed as part of the second component, an extension of the second component, or both.

The illustrative embodiments discussed herein provide a method, an apparatus, and a system for installing a fastener such as a collar and a pin, and storing collars for provisioning to a swage tool.

Figure 1:
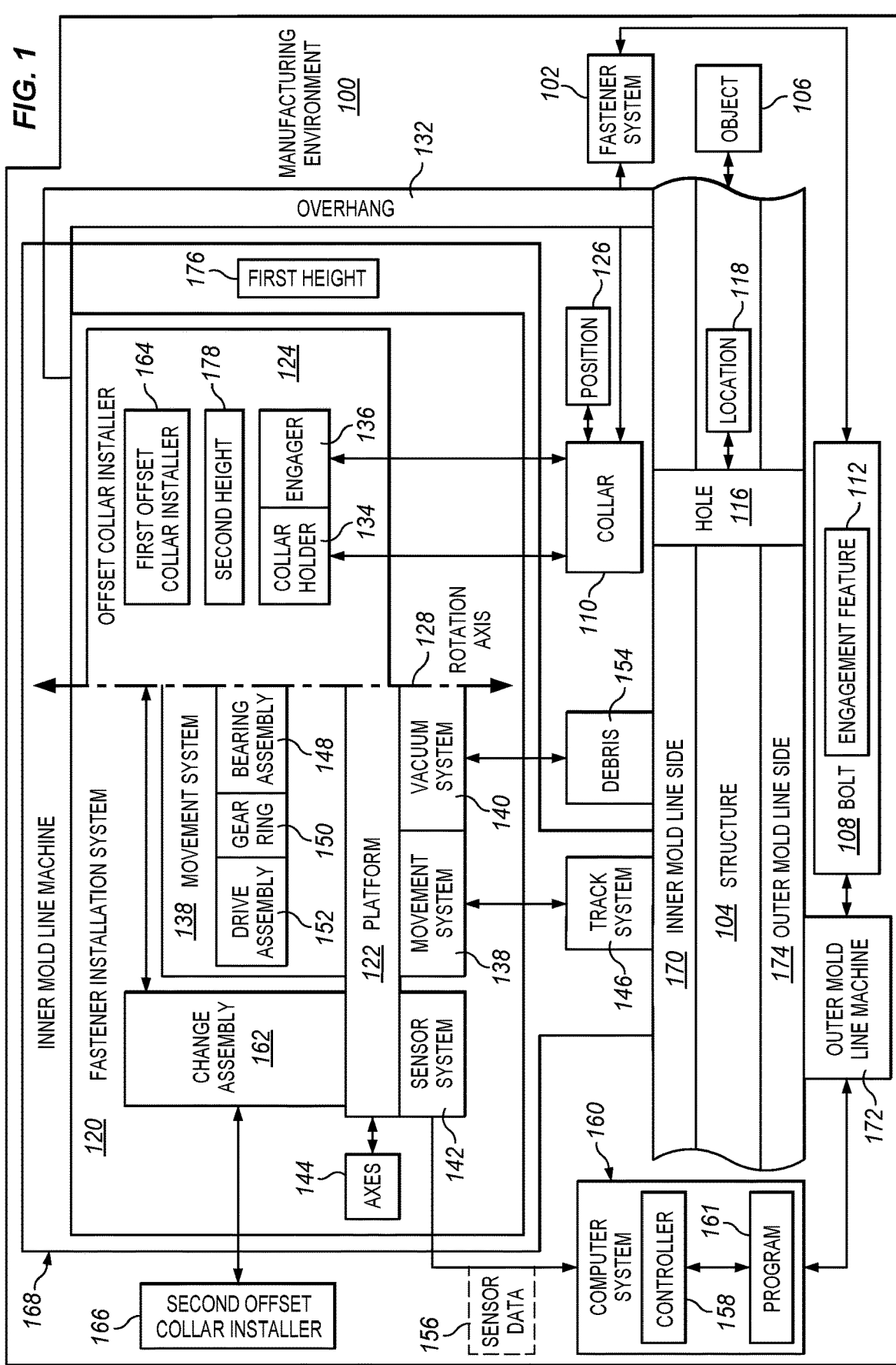
FIG. 1 is an illustration of a block diagram of a manufacturing environment in which a fastener installation system installs fasteners in accordance with an illustrative embodiment.

With reference now to the figures and, in particular, with reference to FIG. 1, an illustration of a block diagram of a manufacturing environment in which a fastener installation system installs fasteners is depicted in accordance with an illustrative embodiment. In this illustrative example, manufacturing environment 100 is an environment in which fastener 102 can be installed in structure 104 for object 106 by fastener installation system 120.

Fastener 102 includes bolt 108 and collar 110. In this illustrative example, bolt 108 can be selected from a group comprising a pin, the pin with a pin-tail, a threaded bolt, and a lock bolt.

As depicted, bolt 108 includes engagement feature 112. Engagement feature 112 can be, for example, a thread, a set of protrusions, a set of grooves, a flange, a set of annular grooves, or some other suitable type of feature that can be engaged by collar 110 and fasten collar 110 and bolt 108 to each other. Collar 110 can be selected from a group comprising a flanged collar, a threaded collar, a nut, a flangeable nut, and any other suitable structure that is configured to receive and facilitate fastening (e.g., of a bolt).

Structure 104 can take a number of different forms. For example, structure 104 can be selected from a group comprising an assembly, a sub-assembly, a fuselage section, a wing, a wing box, a horizontal stabilizer, a landing gear system, a hydraulic system, a skin panel, a stringer, a fuselage section, a composite fuselage section, a support structure with a frame overhang, and some other structure in which fastener 102 can be installed to join two components to each other in structure 104.

Object 106 may take a number of different forms. For example, object 106 may be, for example, a mobile platform, a stationary platform, a land-based structure, an aquatic-based structure, and a space-based structure. More specifically, object 106 can be a surface ship, an aircraft, a tank, a personnel carrier, a train, a spacecraft, a space station, a satellite, a submarine, an automobile, a power plant, a bridge, a dam, a house, a manufacturing facility, a building, and other suitable types of objects.

As depicted, structure 104 includes hole 116 at location 118. In this illustrative example, fastener installation system 120 is configured to install fastener 102 in hole 116. While a collar installer 124 is illustrated in FIG. 1, any suitable tool and/or collar installer may be utilized in accordance with the inventive techniques described herein. As explained above, "collars" as used herein can be selected from a group comprising a flanged collar, a threaded collar, a nut, a flangeable nut, and any other suitable structure that is configured to facilitate fastening (e.g., of a bolt).

During operation of fastener installation system 120, platform 122 is configured to be movably positioned on structure 104. Collar installer 124 is connected to platform 122. Collar installer 124 can hold collar 110 for installation in position 126 offset from rotation axis 128 and can fasten collar 110 to bolt 108 with engagement feature 112. As depicted, collar installer 124 can swing into position 126 offset from rotation axis 128. For example, collar installer 124 can rotate about rotation axis 128 to into position 126 offset from rotation axis 128 to install fastener 102 in hole 116.

In this illustrative example, overhang 132 may be such that all of fastener installation system 120 cannot move on structure 104 to fit under overhang 132. As depicted, collar installer 124 is configured to rotate around rotation axis 128 into position 126 offset in a manner that allows collar installer 124 to fit under overhang 132 such that collar 110 can be positioned and fastened to bolt 108 in hole 116. In other words, a portion of collar installer 124 can fit under overhang 132 or other restricted areas where other currently available collar installers in automated collar installation systems cannot fit. Again, although a collar installer 124 and an offset swage tool are illustrated in these FIGS., the collar delivery systems described herein may be utilized for any type of swage tool desired.

In the illustrative example, fastener installation system 120 comprises collar holder 134 and engager 136. As depicted, collar holder 134 is configured to hold collar 110 in position 126 to receive bolt 108. In this example, collar 110 is stationary while bolt 108 moves through hole 116. In another illustrative example, bolt 108 is stationary in hole 116 while collar 110 moves towards hole 116 to receive bolt 108.

Engager 136 configured to fasten collar 110 to bolt 108. For example, engager 136 may swage collar 110 to bolt 108 such that collar 110 is fastened to bolt 108. In another illustrative example, engager 136 can rotate collar 110 about rotation axis 128 relative to bolt 108 to fasten collar 110 to bolt 108. As depicted, collar holder 134 and engager 136 form the collar installer 124.

In this illustrative example, fastener installation system 120 includes a number of other components. For example, fastener installation system 120 also includes movement system 138, vacuum system 140, and sensor system 142.

As depicted, movement system 138 is connected to platform 122. Movement system 138 can be configured to move at least one of platform 122 or collar installer 124.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

For example, movement system 138 is connected to collar installer 124 and is configured to move collar installer 124 around rotation axis 128. Further, movement system 138 is further configured to move platform 122 along axes 144 and in addition to moving the collar installer 124 around rotation axis 128.

In one illustrative example, movement system 138 can be coupled to or placed on track system 146. As depicted, the movement along axes 144 can be relative to track system 146. Axes 144 can be, for example, two axes, three axes, or some other number of axes depending on the particular implementation. In this illustrative example, platform 122 is configured to move on track system 146, which is selected from at least one of a flexible track system, a dual track system, a flexible vacuum track system configured to be attached to structure 104, or some other suitable type.

In another illustrative example, movement system 138 can move collar installer 124 about rotation axis 128 using a number of different components. As depicted, these components in movement system 138 include bearing assembly 148, gear ring 150, and drive assembly 152. Again, although a collar installer 124 and an offset swage tool are illustrated in these FIGS., the collar delivery systems described herein may be utilized for any type of tool desired.

As depicted, bearing assembly 148 is connected to collar installer 124. Bearing assembly 148 is configured to move around rotation axis 128. Gear ring 150 is connected to bearing assembly 148. Drive assembly 152 is moveably connected to gear ring 150. In this illustrative example, drive assembly 152 is configured to move gear ring 150. As a result, movement of drive assembly 152 moves bearing assembly 148 via gear ring 150.

In this illustrative example, vacuum system 140 is connected to platform 122. Vacuum system 140 is configured to remove debris 154 around hole 116. The debris can be, for example, particles generated from drilling the hole 116. In another example, when bolt 108 takes the form of a pin with a pin tail, debris 154 can include the pin tail that separates from the pin after swaging the collar to the pin. For example, when bolt 108 is a pin with a pin tail, a pin tail deflector (not shown) can guide the pin tail to a port (not shown) in vacuum system 140 after the pin tail is separated from the pin.

In this illustrative example, sensor system 142 is also connected to platform 122. As depicted, sensor system 142 is a physical hardware system that detects information about the environment around fastener installation system 120.

Sensor system 142 is configured to generate sensor data 156. Sensor data 156 can include information about structure 104, a position of collar installer 124, a position of platform 122 relative to structure 104, an image of hole 116, and other information that can be used to control the operation of fastener installation system 120. Sensor system 142 can include at least one of a camera system, a laser sensor, an ultrasonic sensor, a light detection and ranging scanner, or some other suitable type of sensor.

Sensor data 156 is sent to controller 158 located in computer system 160. Controller 158 can be implemented in at least one of software or hardware. When software is used, the operations performed by controller 158 may be implemented in program code configured to run on hardware, such as a processor unit. When firmware is used, the operations performed by controller 158 may be implemented in program code and data and stored in persistent memory to run on a processor unit. When hardware is employed, the hardware may include circuits that operate to perform the operations in controller 158.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 160 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Controller 158 controls the operation of fastener installation system 120 utilizing program 161. Program 161 may be, for example, a computer numerical control (CNC) program or some other suitable program code that may be used to control the operation of fastener installation system 120. For example, fastener installation system 120 can be a computer numerical control (CNC) machine which uses cartesian coordinates.

Controller 158 can utilize sensor data 156 to control the operation of different components in fastener installation system 120. Although shown as a separate component, controller 158 and computer system 160 may be located on or in platform 122 in some illustrative examples.

Further, fastener installation system 120 can also include change assembly 162 that is connected to platform 122. In this example, collar installer 124 is first collar installer 164 and is connected to platform 122 indirectly through a connection to change assembly 162. First collar installer 164 is removably connected to change assembly 162. Different collar installers may be configured to install at least one of different sizes or different configurations of fasteners. In other words, a quick change can be made between collar installers to install fasteners of different sizes.

Further, platform 122, collar installer 124, movement system 138, vacuum system 140, and sensor system 142 form an inner mold line machine 168 located on inner mold line side 170 of structure 104 in this illustrative example. Further, fastener installation system 120 also can include outer mold line machine 172 configured to insert bolt 108, such as a pin, through hole 116 from outer mold line side 174 of structure 104. In this illustrative example, outer mold line machine 172 also can be controlled by controller 158 in computer system 160 to perform a coordinated installation of fastener 102 in hole 116 in structure 104.

In one illustrative example, one or more technical solutions are present that overcome a technical problem with installing fasteners in structure 104 that has overhang 132 wherein hole 116 is to be installed. In the illustrative example, first height 176 for inner mold line machine 168 can be great enough that inner mold line machine 168 is unable to fit under overhang 132.

As a result, one or more technical solutions may provide a technical effect configuring the collar installer 124 such that collar installer 124 moves around rotation axis 128 for platform 122. Collar installer 124 has second height 178 that is less than first height 176. Further, second height 178 is such that collar installer 124 can swing around rotation axis 128 to hole 116 located under overhang 132. In other words, collar installer 124 has second height 178 that is low enough to allow collar installer 124 to swing or rotate into place to position collar 110 over hole 116 and fasten collar 110 to bolt 108 located in hole 116. As a result, fastener installation system 120 can install fastener 102 in a manner that avoids current issues with fastener installation systems with respect to overhang 132.

Figure 2:
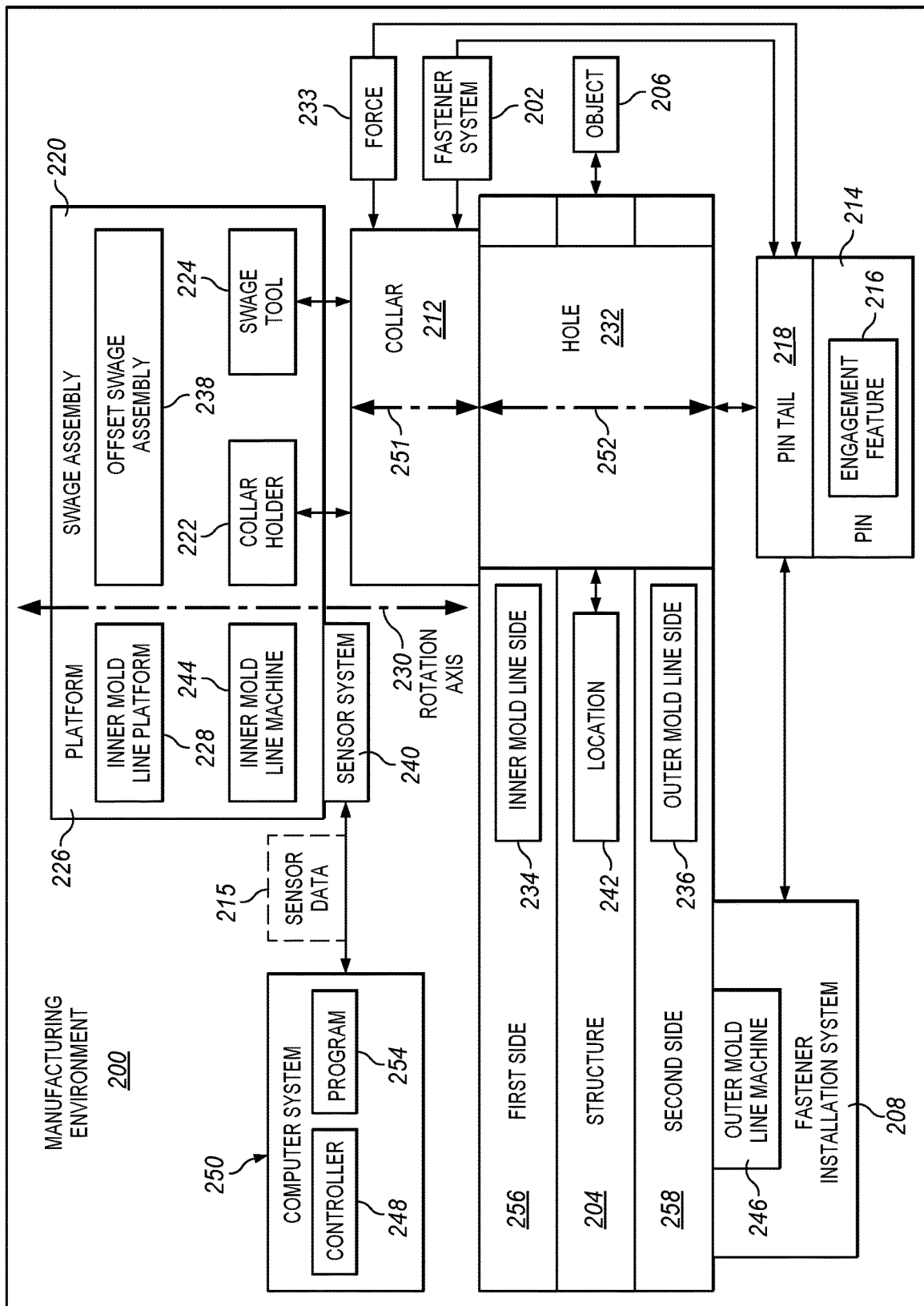
FIG. 2 is an illustration of a block diagram of a manufacturing environment in which a fastener is installed in accordance with an illustrative embodiment.

With reference next to FIG. 2, an illustration of a block diagram of a manufacturing environment in which a fastener is installed is depicted in accordance with an illustrative embodiment. Manufacturing environment 200 is an environment in which fastener 202 can be installed in structure 204 for object 206 utilizing fastener installation system 208. Structure 204 and object 206 may take various forms similar to the forms described with respect to structure 104 and object 106 in FIG. 1. Again, although a collar installer 124 and an offset swage tool are illustrated in these FIGS., the collar delivery systems described herein may be utilized for any type of tool desired. Structure 204 can be, for example, without limitation, comprising a metal structure, composite structure, a metal and composite work piece, a splice, a butt splice, a splice for two fuselage sections, or some other suitable structure.

As depicted, fastener 202 comprises pin 214 and collar 212. In this illustrative example, collar 212 can be swaged to pin 214. In other words, collar 212 can be deformed to engage engagement feature 216 on pin 214. Pin 214 also may include pin tail 218. In this illustrative example, engagement feature 216 may be, for example, a thread, a set of protrusions, a set of grooves, a flange, or some other suitable type of feature that can be engaged by collar 212 and fasten collar 212 to pin 214.

As depicted, fastener installation system 208 comprises swage assembly 220, which is configured to cause collar 212 to engage with pin 214. In this illustrative example, swage assembly 220 is an example of collar installer 124 in FIG. 1 and comprises collar holder 222 and swage tool 224. Collar holder 222 is configured to hold collar 212. Swage tool 224 is configured to cause collar 212 to engage engagement feature 216 on pin 214. In this example, pin 214 and pin tail 218 are inserted into collar 212. In other words, pin 214 and pin tail 218 are moved through collar 212 after collar 212 has been positioned on hole 232.

Pin tail 218 is a component connected to pin 214. In this particular example, swage tool 224 engages pin tail 218 and pulls pin 214 through collar 212 in a manner that causes collar 212 to deform in a manner that engages engagement feature 216. Engagement feature 216 is a feature on pin 214 and not pin tail 218. Engagement feature 216 can be at least one of a set of threads, a set of grooves, a set of annular grooves, or other types of features to which collar 212 can be swaged to engage pin 214.

In the illustrative example, causing collar 212 to engage engagement feature 216 can be performed any number of different ways. For example, force 233 can be applied on at least one of collar 212 or pin tail 218 along centerline 251 extending centrally though collar 212 until pin tail 218 become separated from pin 214 such that collar 212 engages engagement feature 216 on pin 214 when pin 214 with pin tail 218 is inserted into hole 232 from second side 258. In other words, force 233 can be applied to one or both of collar 212 or pin tail 218 causing collar 212 to be swaged such that collar 212 engages engagement feature 216 on pin 214.

In this illustrative example, swage assembly 220 can include collar installer 124 in FIG. 1. Collar holder 222 can be an example of collar holder 134 in FIG. 1 and swage tool 224 can be an example of engager 136 in FIG. 1.

As depicted, swage assembly 220 is connected to platform 226. In this illustrative example, platform 226 takes the form of inner mold line platform 228. In this illustrative example, inner mold line platform 228 can be selected from a group comprising a flex track crawler, a robotic arm, and some other suitable type of platform.

In one example, swage assembly 220 is offset swage assembly 238 such that collar 212 is held offset from rotation axis 230 on which swage assembly 220 is located. Depending on the implementation, swage assembly 220 may or may not be offset from rotation axis 230.

As depicted, collar holder 222 in swage assembly 220 is configured to position collar 212 on hole 232. In the illustrative example, the positioning is performed such that collar 212 is concentrically aligned with hole 232. For example, centerline 251 for collar 212 intercepts centerline 252 for hole 232.

In the illustrative examples, the positioning of collar 212 on hole 232 is performed such that collar 212 receives pin 214 when pin 214 is placed into hole 232 on inner mold line side 234 of structure 204 prior to insertion of pin 214 into hole 232 from outer mold line side 236. As depicted, pin 214 be moved in a single motion through hole 232 and collar 212.

When pin 214 is inserted into hole 232, outer mold line side 236 is moved to extend through collar 212, and swage assembly 220 swages the collar 212 such that collar 212 engages engagement feature 216 on pin 214.

As depicted, positioning of collar 212 on hole 232 may result in collar 212 touching the inner mold line side 234. In other illustrative examples, collar 212 may not touch inner mold line side 234 when being positioned on hole 232. In this example, swage tool 224 engages and pulls pin tail 218 such that pin tail 218 and pin 214 moves through collar 212 in a manner that causes collar 212 to swage to engage engagement feature 216 on pin 214.

In positioning the collar 212 on hole 232 on first side 256 of structure 204 prior to insertion of pin 214 into hole 232 from second side 258, swage assembly 220 holds collar 212 in collar holder 222 in swage assembly 220 and moves collar 212 such that collar 212 is positioned on hole 232 on inner mold line side 234 of structure 204. In this illustrative example, first side 256 is inner mold line side 234 and second side 258 is outer mold line side 236.

In another example, in positioning the collar 212 on hole 232 on inner mold line side 234 of structure 204 prior to insertion of pin 214 into hole 232 from outer mold line side 236, swage assembly 220 normalizes collar 212 to inner mold line side 234 and moves collar 212 onto hole 232 on inner mold line side 234 of structure 204 prior to insertion of pin 214 into hole 232 from outer mold line side 236. The normalization includes moving collar 212 about on one or more axes. This movement is performed in this example to provide concentricity between collar 212 and hole 232.

Further, fastener 202 also may include sensor system 240 similar to sensor system 142 in FIG. 1. In positioning the collar 212 on hole 232, sensor system 240 identifies location 242 of hole 232 on inner mold line side 234 and swage assembly 220 moves collar 212 onto hole 232 at location 242 on inner mold line side 234 of structure 204 prior to insertion of pin 214 into hole 232 from outer mold line side 236. As depicted, collar 212 is positioned such that concentricity is present between collar 212 and hole 232. This concentricity enables pin 214 to extend through collar 212 such that collar 212 can be fastened to pin 214.

In the illustrative example, sensor system 142 is a physical hardware system that detects information about the environment around fastener installation system 208. Sensor system 240 is configured to generate sensor data 215. Sensor system 240 can contain one or more types of sensors. For example, sensor system 240 can be selected from at least one of a camera system, a vision system, a laser range finder, or some other suitable type of sensor. Sensor data 215 generated by sensor system 240 can be used to perform alignment of collar 212 with hole 232. This alignment is performed to generate concentricity between collar 212 on hole 232 such that pin tail 218 and pin 214 can be inserted through hole 232 and extends through collar 212 in a desired manner.

In this illustrative example, swage assembly 220 and platform 226 form the inner mold line machine 244. Further, fastener installation system 208 also includes outer mold line machine 246 in this illustrative example. Outer mold line machine 246 is configured to insert pin 214 through hole 232 from outer mold line side 236 of structure 204. As depicted, collar 212 is aligned with hole 232 on inner mold line side 234 prior to pin tail 218 and pin 214 being moved through hole 232 to extend though collar 212.

In this illustrative example, inner mold line machine 244 and outer mold line machine 246 can be controlled by controller 248 in computer system 250 to perform a coordinated installation of fastener 202 in hole 232 in structure 204.

Sensor data 215 is sent to controller 248 located in computer system 250. Controller 248 can be implemented in at least one of software or hardware. When software is used, the operations performed by controller 248 may be implemented in program code configured to run on hardware, such as a processor unit. When firmware is used, the operations performed by controller 248 may be implemented in program code and data and stored in persistent memory to run on a processor unit. When hardware is employed, the hardware may include circuits that operate to perform the operations in controller 248.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 250 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Controller 248 controls the operation of fastener installation system 208 utilizing program 254. Program 254 may be, for example, a computer numerical control (CNC) program or some other suitable program code that may be used to control the operation of fastener installation system 208.

Controller 248 can utilize sensor data 215 to control the operation of different components in fastener installation system 208. Although shown as a separate component, controller 248 and computer system 250 may be located on or in platform 226 in some illustrative examples.

In one illustrative example, fastener installation system 208 comprises collar holder 222, sensor system 240, and controller 248. In this example, collar holder 222 is configured to hold collar 212 in fastener 202. Sensor system 240 is configured to generate sensor data 215 for first side 256 of structure 204. As depicted in this example, controller 248 controls operation of sensor system 240 and collar holder 222. Controller 248 identifies location 242 of hole 232 in first side 256 of structure 204 using sensor data 215 and automatically positions the collar 212 held by collar holder 222 on hole 232 at location 242 by moving collar holder 222.

In one illustrative example, one or more technical solutions are present that overcome a technical problem with automating the installation of fasteners. Currently, when a hole deviates from normal, installing a fastener using current processes may be infeasible.

The illustrative embodiments recognize and take into account that currently employed machines such as those that move on rails attached to structure 204 may be unable to place collar 212 on pin 214 inserted into hole 232 depending on the how much the hole 232 deviates from the normal of the surface of structure 204. For example, the illustrative embodiments recognize and take into account that with currently available fastener installation systems, the deviation of two degrees or more from normal (but within tolerance) can prevent current machines from placing collar 212 accurately for automated installation of fastener 202.

The illustrative examples provide a technical solution in which collar 212 is positioned on hole 232 prior to pin 214 being inserted through hole 232 and collar 212. As a result, one or more technical solutions may provide a technical effect of enabling installing collars on pins in holes that may deviate from normal with respect to the surface of structure 204 even though the holes are still in tolerance.

As a result, a technical solution in the illustrative example may have a technical effect of decreasing cycle time and increasing positional accuracy when holes are angled rather than substantially normal to the surface of structure 204. In the illustrative example, collar 212 is positioned on structure 204 prior to inserting the pin 214.

The illustrations of manufacturing environment 100 in FIG. 1 and manufacturing environment 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, collar installer 124, movement system 138, vacuum system 140, and sensor system 142 have been described as being capable of forming the inner mold line machine 168 located on inner mold line side 170 of structure 104. In other illustrative examples, these components may be part of an outer mold line machine with the inner mold line machine inserting the bolt 108 from inner mold line side 170 of structure 104. As another example, first side 256 could be outer mold line side 236 while second side 258 could be inner mold line side 234 in other implementations.

Figure 3:
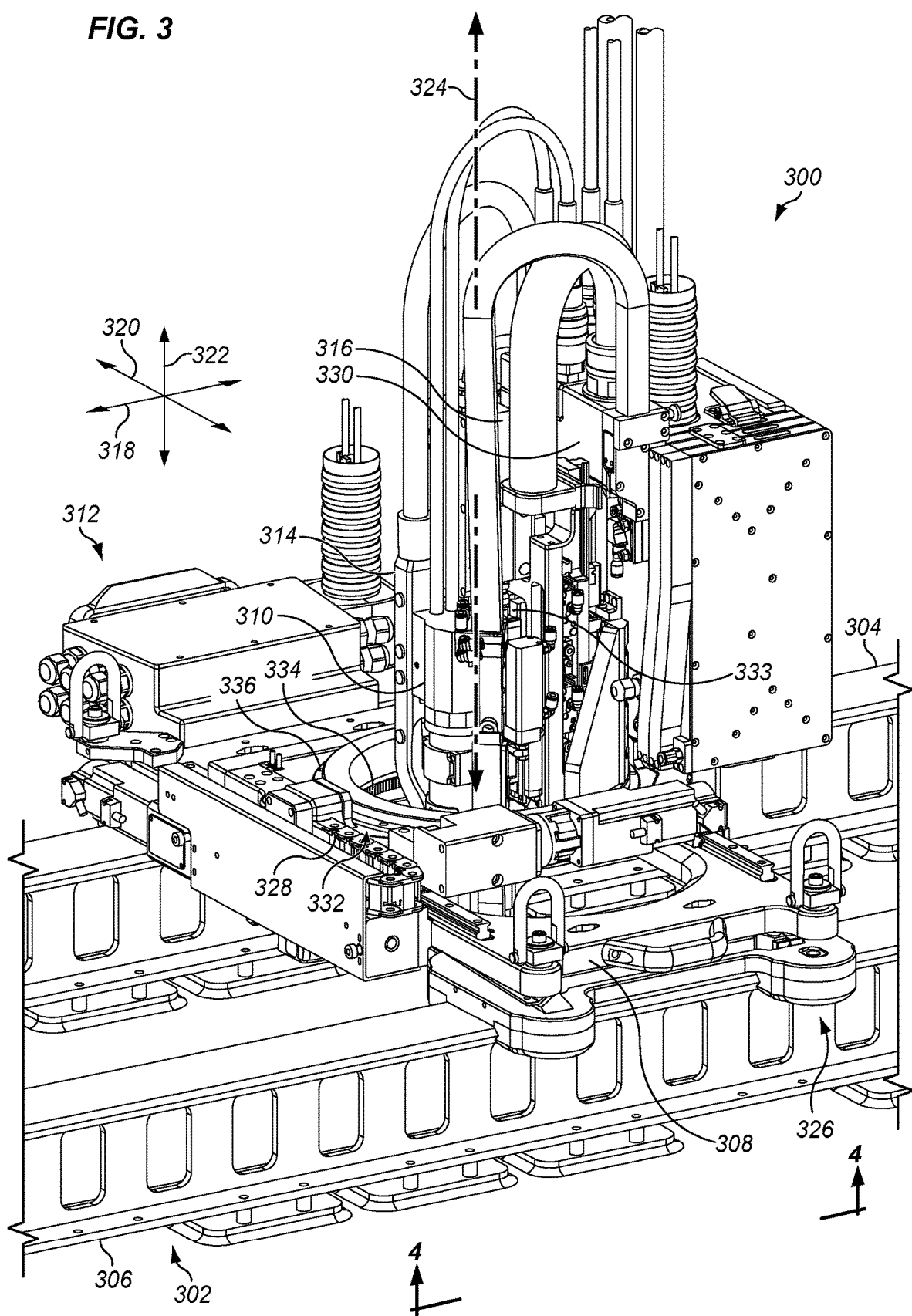
FIG. 3 is an illustration of an inner mold line machine in a fastener installation system in accordance with an illustrative embodiment.

With reference to FIG. 3, an illustration of inner mold line machine 300 in a fastener installation system is depicted in accordance with an illustrative embodiment. In this illustrative example, inner mold line machine 300 moves on track system 302. Track system 302 comprises first track 304 and second track 306.

As depicted, inner mold line machine 300 is an example of one implementation for inner mold line machine 168 in fastener installation system 120. As depicted, inner mold line machine 300 comprises platform 308, offset swage assembly 310, movement system 312, vacuum system 314, and camera 316. In this illustrative example, platform 308 is an example of one implementation for platform 122 shown in block form in FIG. 1. Offset swage assembly 310 is an example of an implementation for collar installer 124 depicted in block form in FIG. 1. Vacuum system 314 is an example of an implementation for vacuum system 140 shown in block form in FIG. 1. Camera 316 is an example of an implementation for sensor system 142 shown in block form in FIG. 1.

As depicted, movement system 312 is configured to move inner mold line machine 300 in a number of different directions. For example, movement system 312 is configured to move platform 308 in the direction of x-axis 318, y-axis 320, and z-axis 322.

Further, movement system 312 is also configured to move offset swage assembly 310 about rotation axis 324. In other words, movement system 312 can cause offset swage assembly 310 to swing around rotation axis 324. Rotation axis 324 is parallel to z-axis 322 in this illustrative example.

As depicted, motorized wheel system 326 is configured to move platform 308 along x-axis 318. Ball screw drive 328 is configured to move platform 308 along y-axis 320. Ball screw drive 330 is configured to move platform 308 along z-axis 322.

As depicted, movement system 312 is configured to move offset swage assembly 310 about rotation axis 324 with bearing assembly 332. In this view, gear ring 334 and outer ring 336 are seen in bearing assembly 332.

In this figure, offset swage assembly 310 is connected to gear ring 334 in bearing assembly 332. As depicted, gear ring 334 rotates about rotation axis 324 in this example. Outer ring 336 is connected to platform 308 and gear ring 334 is configured to rotate within outer ring 336. Further, vacuum system 314 and camera 316 are also connected to bearing assembly 332 such that these components also can be rotated about rotation axis 324. In this example, offset swage assembly 310 is removably attached to platform 308 by adapter 333.

Figure 4:
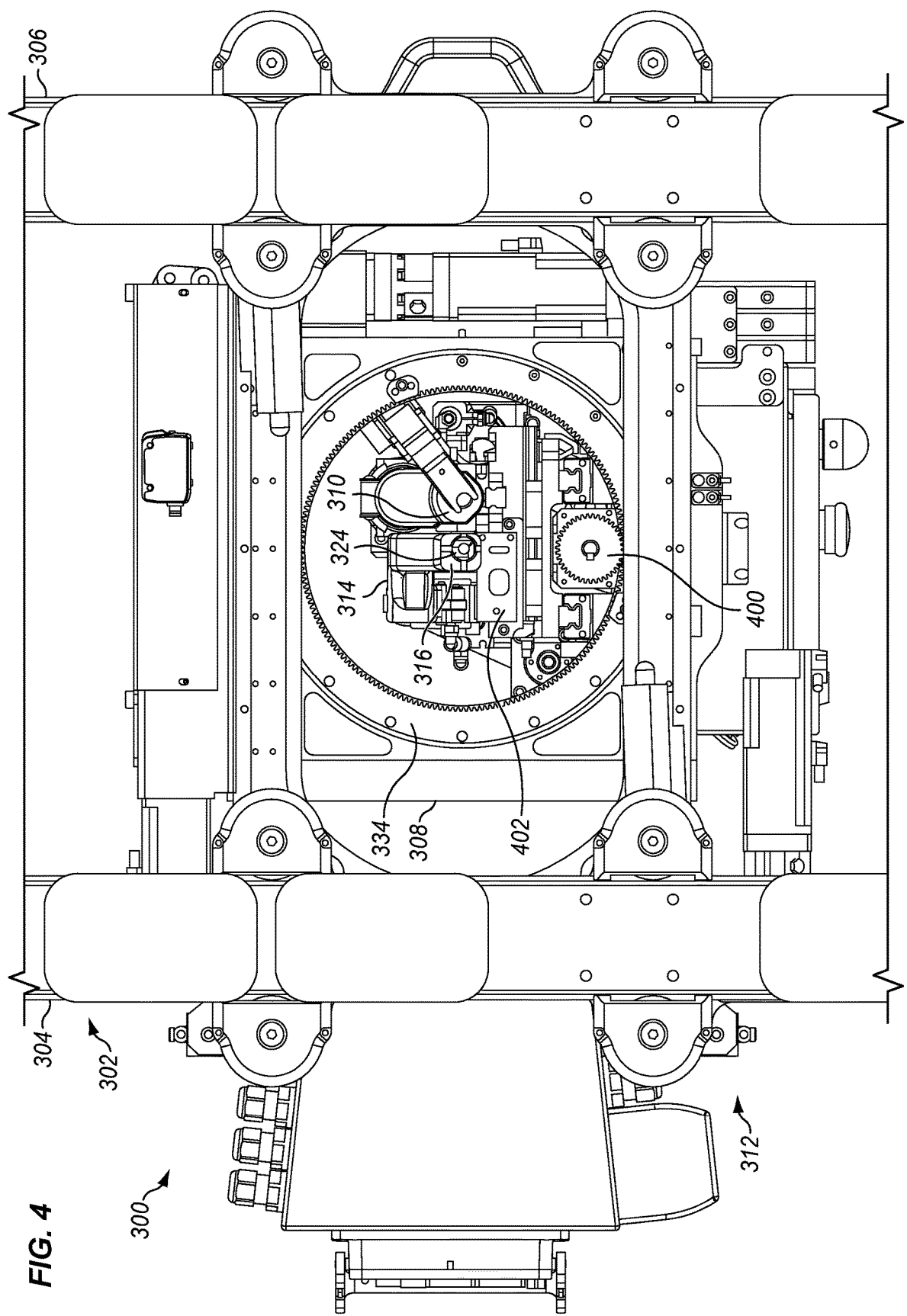
FIG. 4 is an illustration of a bottom view of an inner mold line machine in accordance with an illustrative embodiment.

With reference next to FIG. 4, an illustration of a bottom view of inner mold line machine 300 is depicted in accordance with an illustrative embodiment. Again, although a collar installer 124 and offset swage tool are illustrated in these FIGS., the collar delivery systems described herein may be utilized for any type of swage tool desired. In this example, inner mold line machine 300 as seen from a bottom view in the direction of lines 4-4 in FIG. 3.

In this example, movement system 312 is configured to move offset swage assembly 310 about rotation axis 324 with bearing assembly 332, however the inventive systems and methods described herein are not limited to offset devices. As depicted, gear ring 334 is connected to platform 308. As depicted, gear ring 334 is moveably connected to platform 308.

In this illustrative example, offset swage assembly 310, vacuum system 314, and camera 316 are shown as connected to gear ring 334. In other words, these components are configured to rotate around rotation axis 324 as gear ring 334 rotates about rotation axis 324. The different components may be directly or indirectly connected to gear ring 334.

As depicted, drive 400 is a motorized unit configured to cause offset swage assembly 310, vacuum system 314, and camera 316 to rotate around rotation axis 324 by moving gear ring 334.

In this illustrative example, laser sensor 402 is adjacent to camera 316. Laser sensor 402 detects the distance from laser sensor 402 to an inner mold line surface (not shown).

In this example, bearing assembly 332 with gear ring 334, outer ring 336, and drive 400 allows for 360 degrees of rotation of offset swage assembly 310, vacuum system 314, camera 316, and laser sensor 338 around rotation axis 324. In this manner, offset swage assembly 310 is configured to swing into a desired position offset from rotation axis 324.

Figure 5:
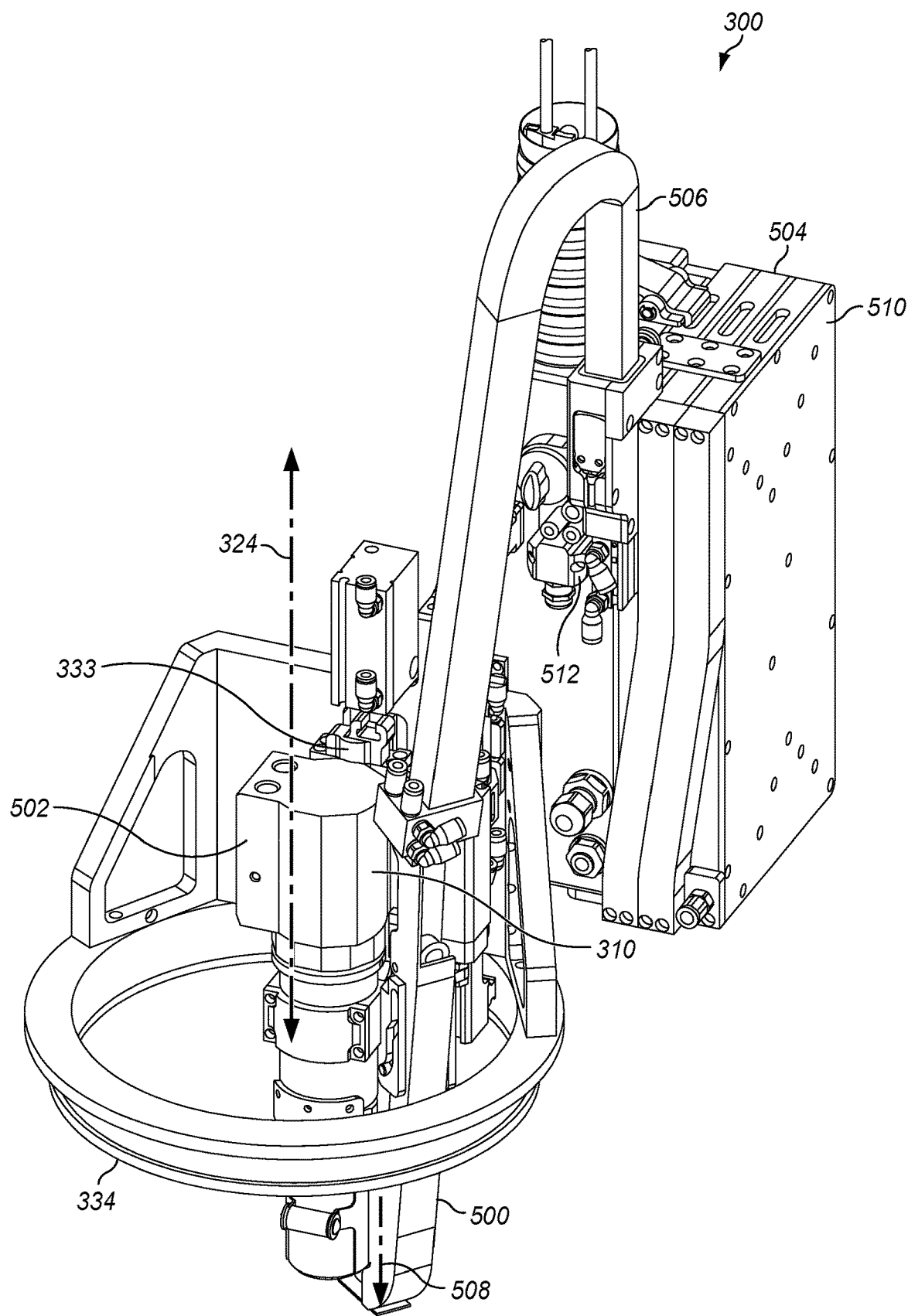
FIG. 5 is an illustration of a portion of an inner mold line machine in accordance with an illustrative embodiment.

With reference to FIG. 5, an illustration of a portion of inner mold line machine 300 is depicted in accordance with an illustrative embodiment. In this illustrative example, offset swage assembly 310 is within gear ring 334 while other components for inner mold line machine 300 are not shown. This partial illustration is employed to describe components in offset swage assembly 310 in a manner that avoids obscuring the illustration and description of these components.

In this illustrative example, offset swage assembly 310 comprises a number of different components. As depicted, offset swage assembly 310 includes collar holder 500, collar swage 502, and magazine 504. Collar holder 500 is an example of one implementation for collar holder 134 shown in block form in FIG. 1. Collar swage 502 is an example of an implementation for engager 136 shown in block form in FIG. 1.

In this illustrative example, collar holder 500 is configured to receive a collar (not shown) from magazine 504 and hold the collar for swaging by collar swage 502. As depicted, magazine 504 is connected to collar holder 500 by tube 506. Magazine 504 holds collars (not shown).

As depicted, collar holder 500 holds a collar (not shown) on axis 508 which is parallel to rotation axis 324. As shown in this illustrative example, offset swage assembly 310 is configured to rotate about rotation axis 324 when gear ring 334 is moved. As offset swage assembly 310 rotates, axis 508 rotates about rotation axis 324 and can move from side to side of rotation axis 324.

In the depicted example, magazine 504 in FIG. 5 includes one or more cartridges 510. Again, although a collar installer 124 and offset swage tool are illustrated in these FIGS., the collar delivery systems described herein may be utilized for any type of swage tool desired. Collars (not shown) stored in cartridge 510 can be fed from cartridge 510 to collar holder 500 using collar injector 512. Collar injector 512 can be a cam or cam activated collar feed mechanism and may use compressed air to feed a collar (not shown) to collar holder 500 from magazine 504 via tube 506. In this manner, cartridge 510 functions as an onboard supply of collars for offset swage assembly 310 in inner mold line machine 300.

The illustration of inner mold line machine 300 in FIGS. 3-5 is not meant to limit the manner in which an inner mold line machine or other machine employing a collar installer may be implemented. For example, other types of fasteners may be used in place of offset swage assembly 310 in which pins and collars are inserted by swaging. For example, another type of collar installer may cause engagement by rotating at least one of a collar or a bolt such that threads or grooves in these components engage each other.

In another illustrative example, other types of rotational systems may be implemented in which other degrees of movement are present other than 360 degrees. In another illustrative example, offset swage assembly 310 moves 90 degrees, 180 degrees, 270 degrees, or some other amounts of movement about rotation axis 324. In yet another illustrative example, vacuum system 314 (of FIG. 3) may be omitted from inner mold line machine 300. In still another illustrative example, these components may be implemented as part of an outer mold line machine.

Figure 6:
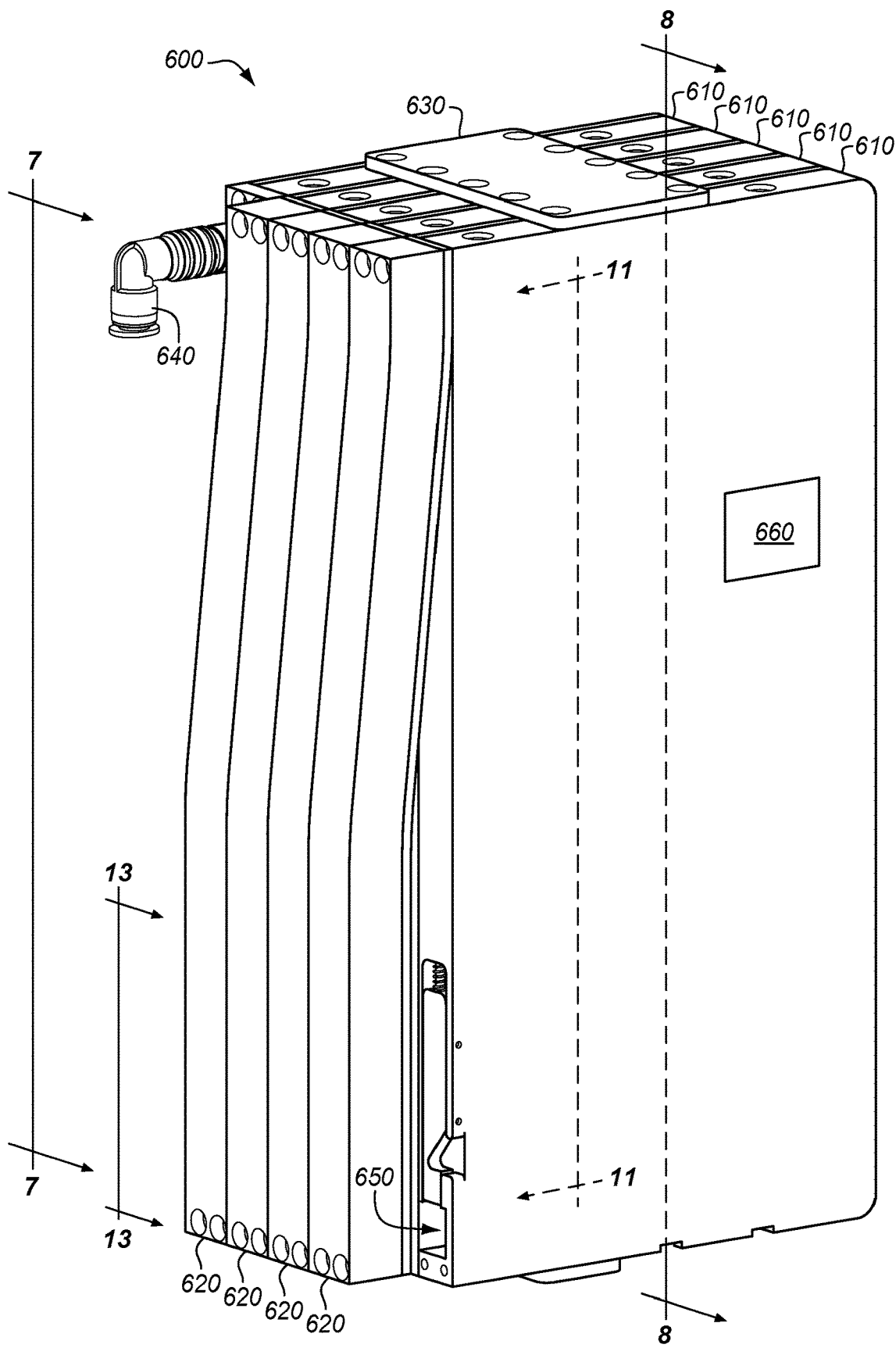
FIG. 6-7 are illustrations of an expandable magazine that includes multiple stacked cartridges coupled via connectors in accordance with an illustrative embodiment.
Figure 7:
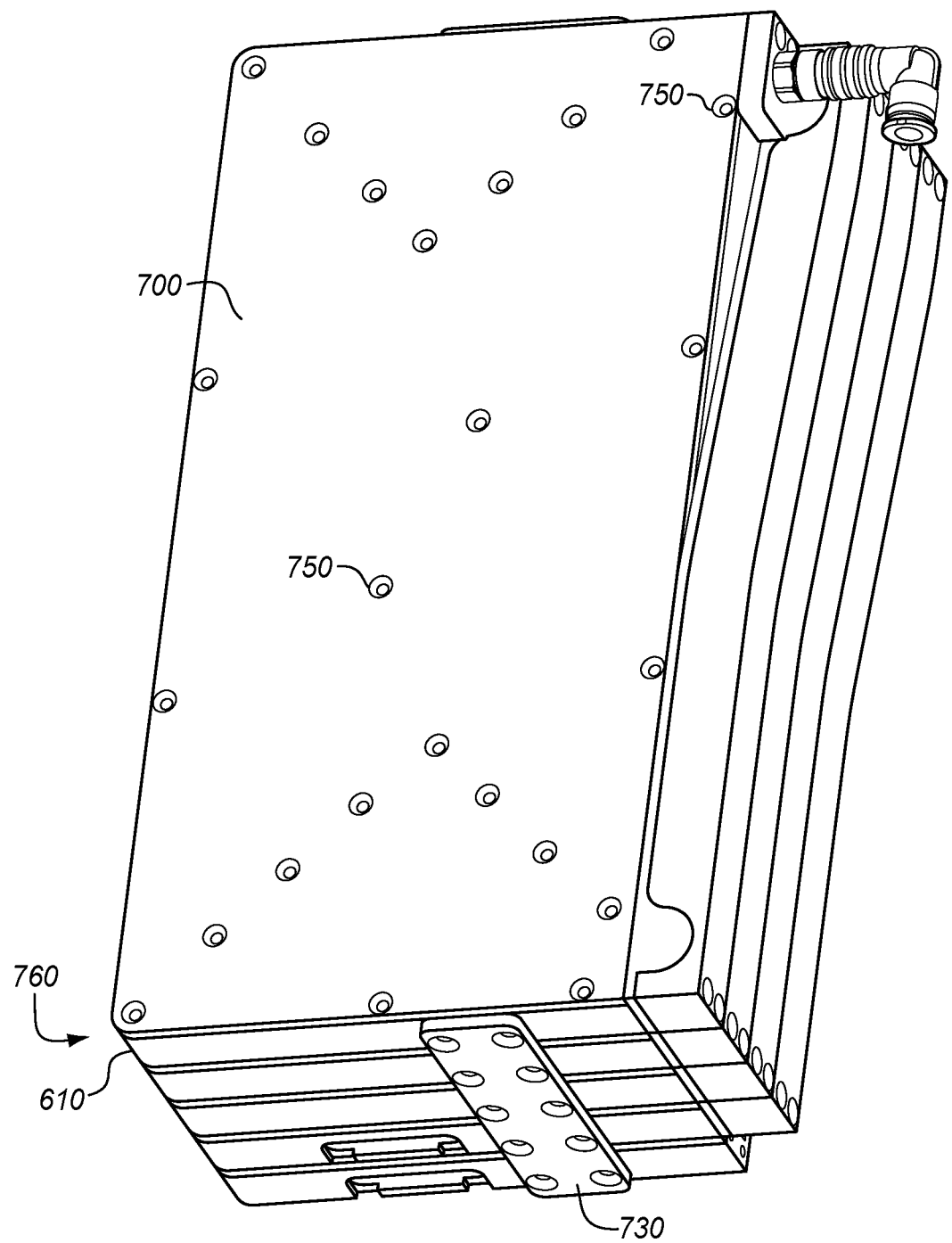
Figure 8:
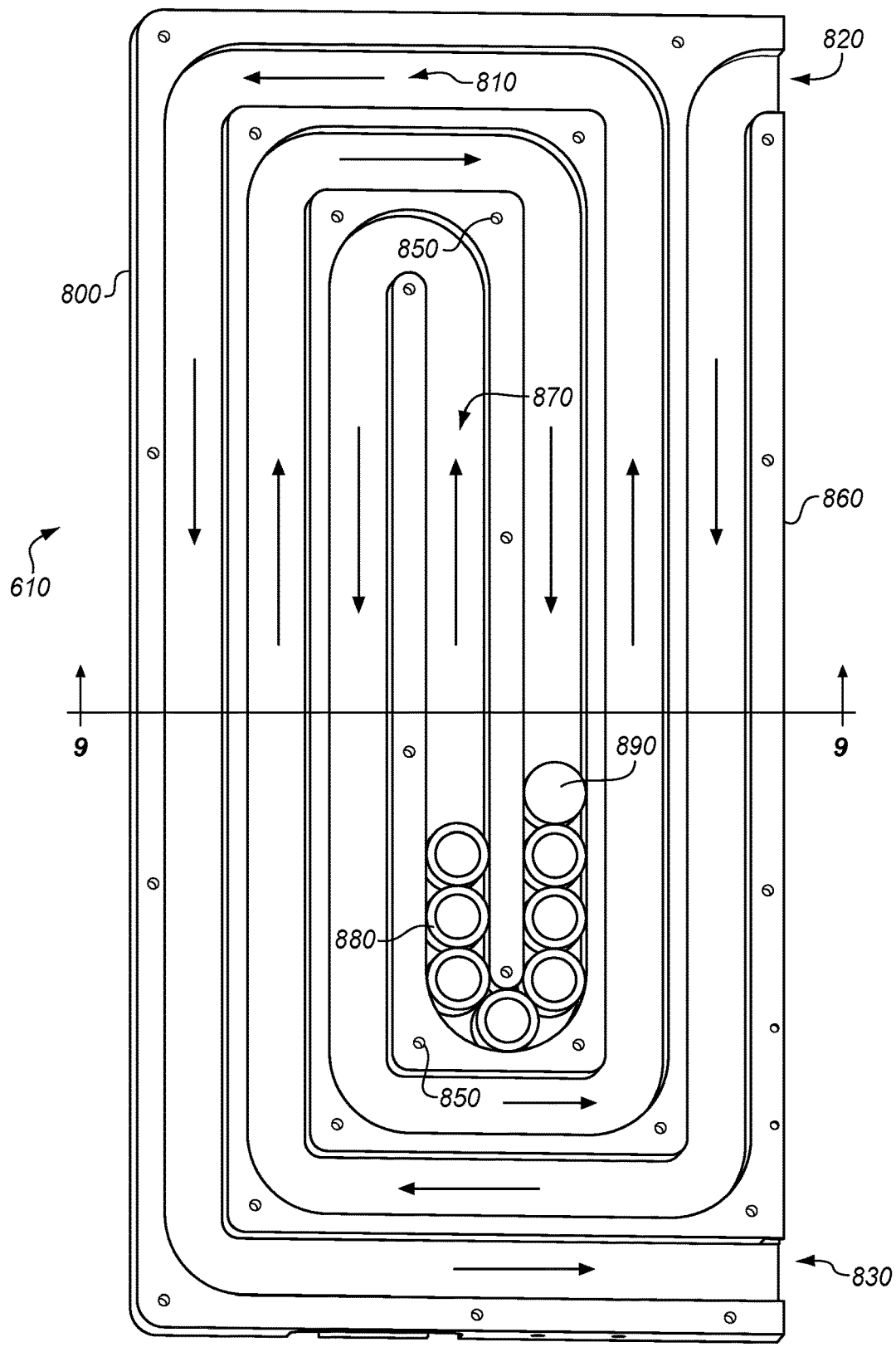
FIG. 8 is a back view of a stackable cartridge for a magazine in accordance with an illustrative embodiment.
Figure 9:
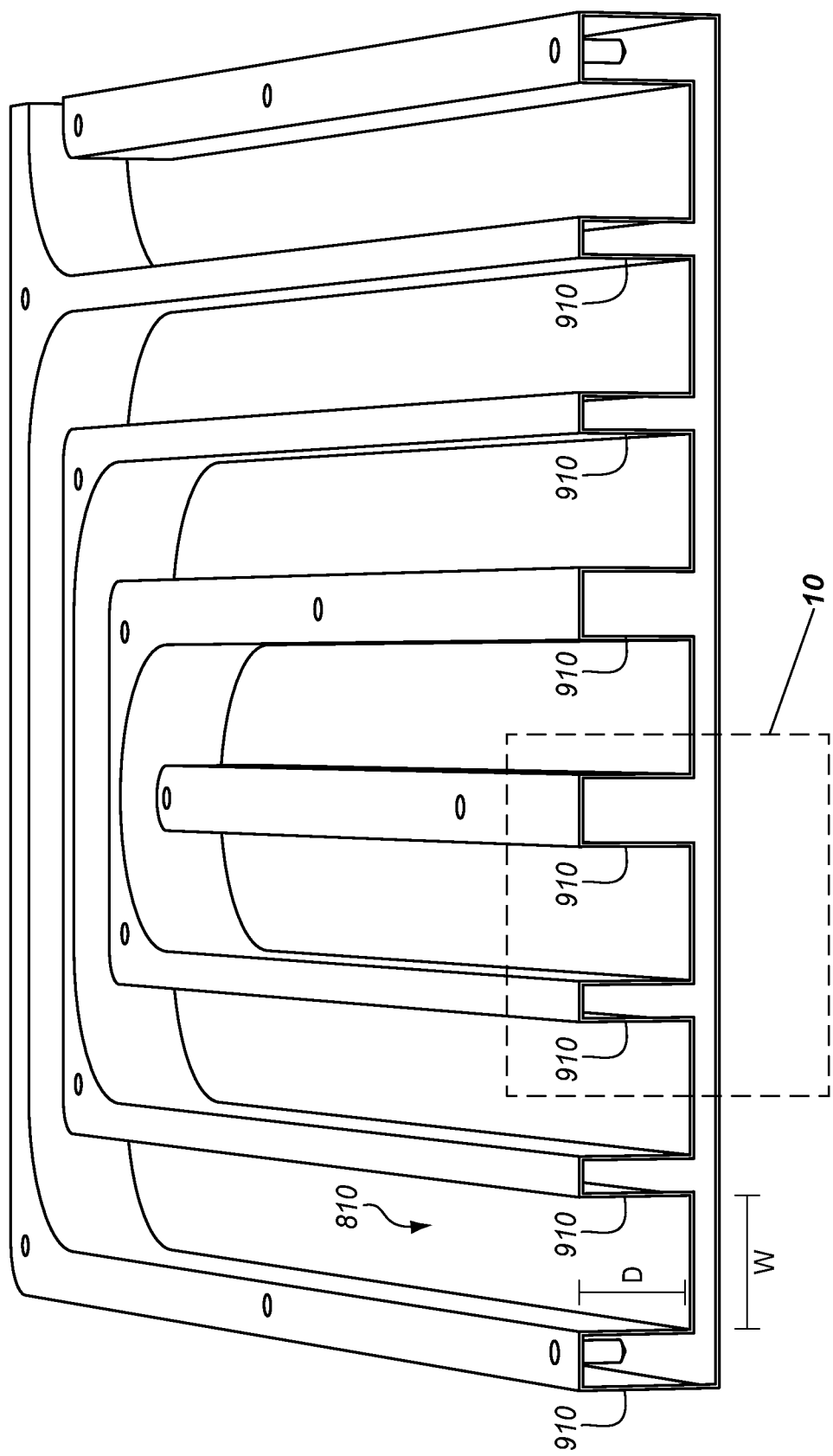
FIG. 9 is a cut-through view of a stackable cartridge in accordance with an illustrative embodiment.
Figure 10:
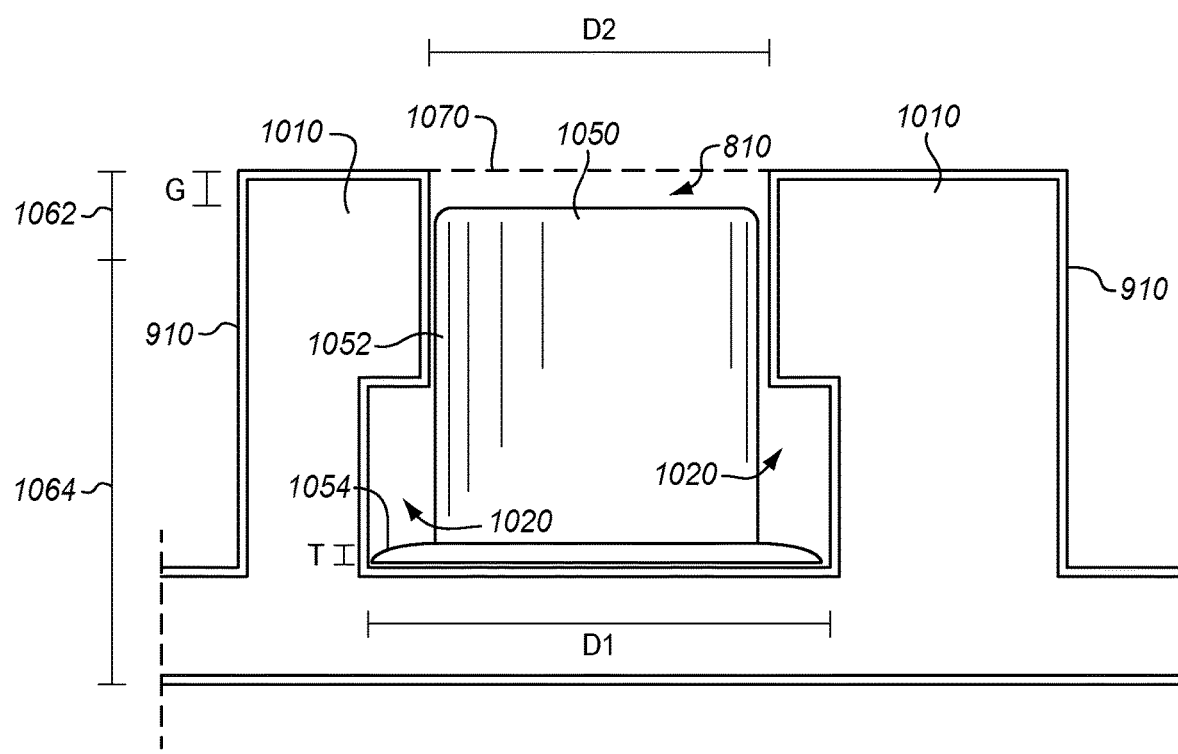
FIG. 10 is a zoomed in view of a cross section of a serpentine channel in an illustrative embodiment.
Figure 13:
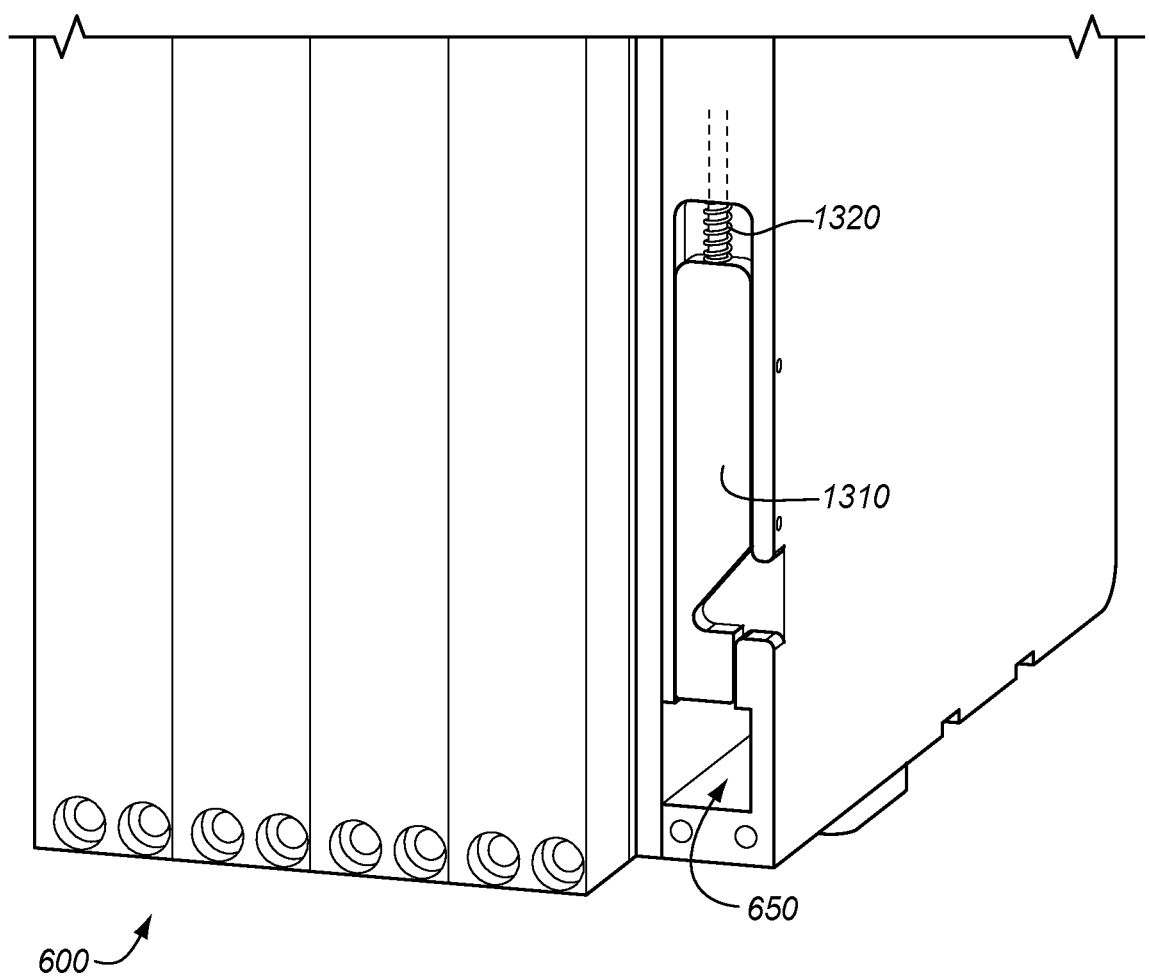
FIG. 13 illustrates a loading port for a magazine in accordance with an illustrative embodiment.
Figure 14:
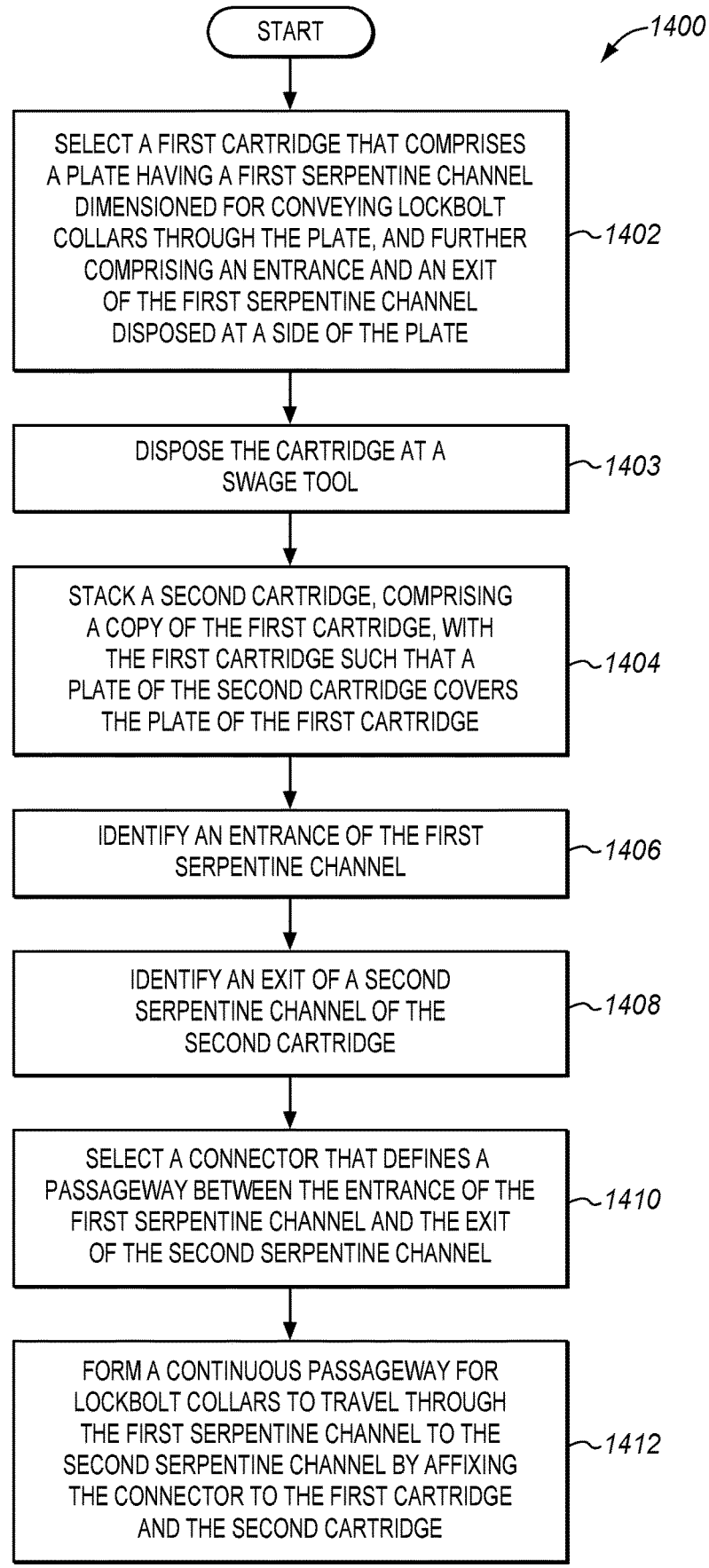
FIG. 14 is a flowchart illustrating a method for assembling an expandable magazine that includes multiple stacked cartridges coupled via connectors in accordance with an illustrative embodiment.
Figure 15:
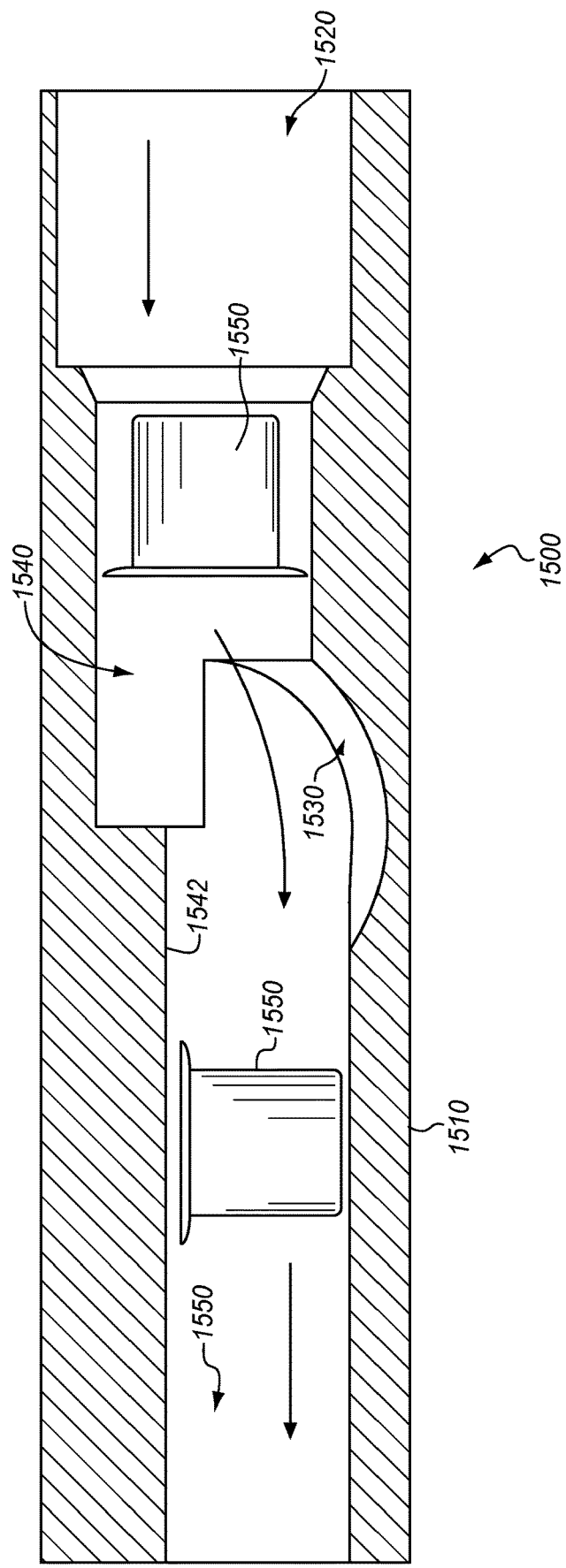
FIG. 15 is a cut-through view of a collar flip device in an illustrative embodiment.
Figure 16:
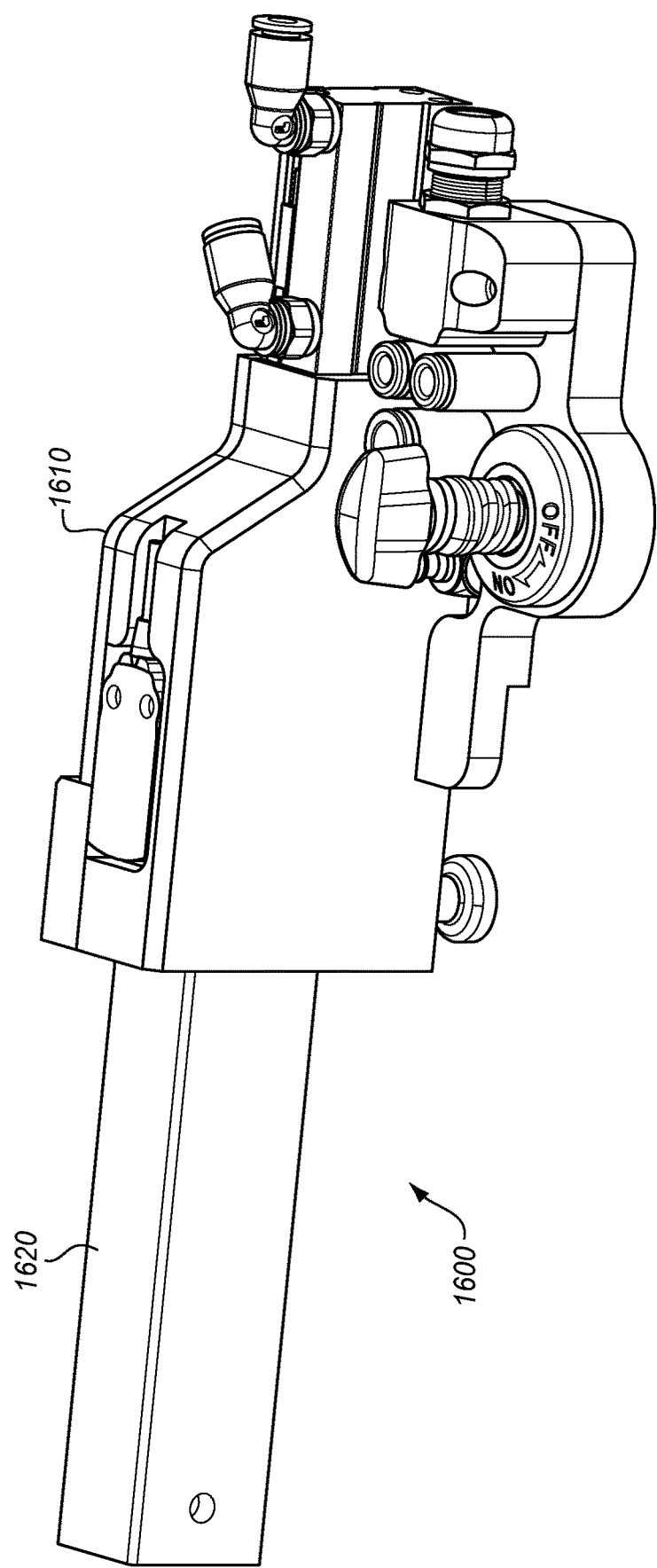
FIGS. 16-17 are perspective views of a collar injector in accordance with an illustrative embodiment.
Figure 17:
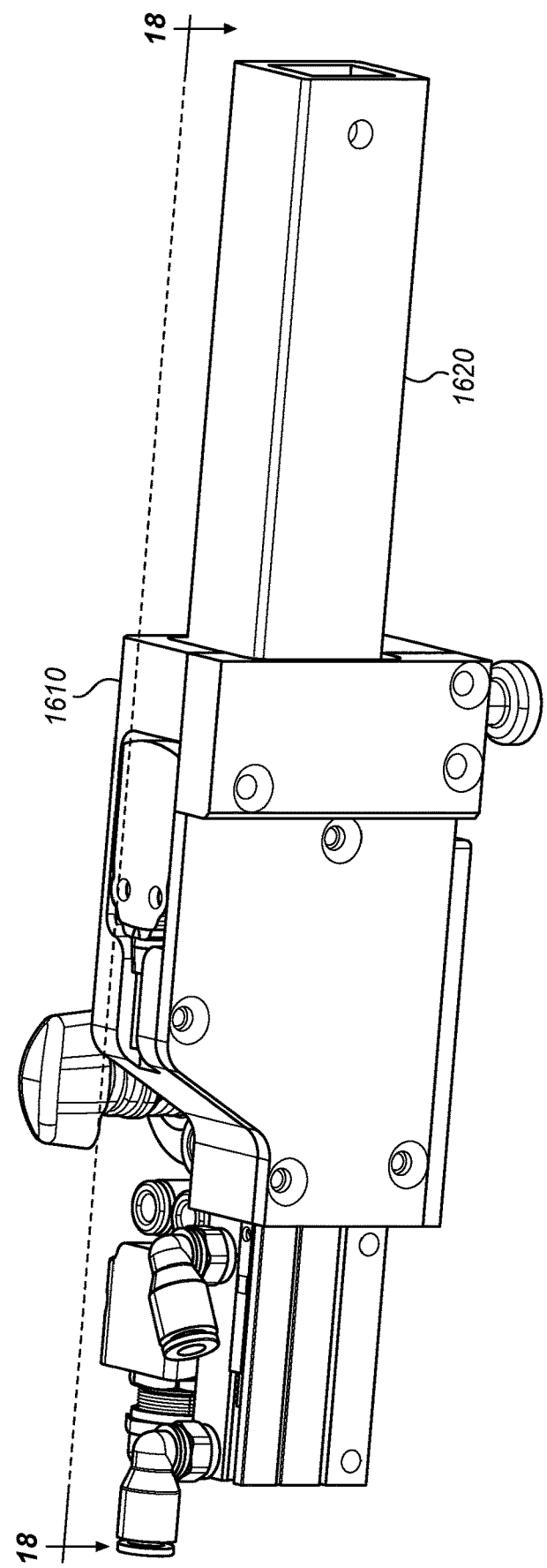

The following FIGS. illustrate additional features of magazine 504 and associated collar feeding components. Specifically, FIGS. 6-7 illustrate magazine 504, FIGS. 8-9 illustrate a cartridge 510 at magazine 504, FIGS. 10-11 illustrate connectors that couple cartridges, FIG. 12 illustrates an entrance port for magazine 504, and FIG. 13 illustrates a method for assembling magazine 504. Meanwhile, FIG. 14 illustrates a collar flipping device that changes an orientation of collars in magazine 504, and FIGS. 15-17 illustrate a collar injector which may provide collars for use by a swage tool.

FIG. 6-7 are illustrations of an expandable magazine 600 that includes cartridges 610 that are stacked together and coupled via connectors in accordance with an illustrative embodiment. According to FIG. 6, cartridges 610 are placed next to each other in a stacked configuration, and are secured in place via bracket 630 which is affixed to each of the cartridges 610. Connectors 620 couple the cartridges 610 together in order to form a continuous passageway for collars to travel between cartridges 610. A port 640 applies pneumatic pressure to an inlet of the expandable magazine 600, driving collars through expandable magazine 600. Port 640 may be snapped into place for coupling with a pneumatic source, enabling expandable magazine 600 to be quickly exchanged for another magazine. Cartridges may be quick-changed using similar techniques. Collars may be ejected from the expandable magazine 600 towards a swage tool (e.g., offset swage assembly 310) via the exit port 650. While the expandable magazine 600 is dimensioned to accommodate one size of collar (e.g., $3/16''$, $1/4''$, $5/16''$), in further embodiments different versions of an expandable magazine 600 may be dimensioned to accommodate other sizes of collar. Cartridges within an expandable magazine do not ever change in size in terms of their footprint or the size of collars carried, although cartridges may be swapped out and replaced with cartridges of different sizes. In some embodiments, a vibration generator 660 (e.g., driven by electromechanical, electromagnetic, piston, or turbine systems that provide vibratory motion to the collar assembly) are used to reduce friction as collars slide within cartridges 610, regardless of gravity orientation. Vibration generator 660 may be mounted internally or externally to an expandable magazine 600, and may operate continuously or periodically as desired to prevent collar jamming and assist collar movement. As used herein, a "collar" may comprise a lockbolt collar, or may even comprise a nut or flangeable nut. In still further embodiments, a swaging tool may be loaded with multiple expandable magazines 600, each expandable magazine 600 accommodating a collar of a different size. In this manner, by swapping collar injectors and ports, the swaging tool may rapidly transition between collar sizes for swaging.

Use of a stackable cartridge system as depicted herein provides for a more streamlined and reliable process of transferring collars to a swage tool, especially in comparison with prior umbilical collar delivery techniques, which were subject to kinking and jamming. Thus, the systems and techniques provided herein act as suitable replacement delivery mechanisms for umbilical systems.

FIG. 7 illustrates a further view of expandable magazine 600, and corresponds with view arrows 7 of FIG. 6. Another bracket 730 is depicted in FIG. 7, as well as a cover 700 disposed over a cartridge 610 positioned at an end 760 of the expandable magazine 600. Cover 700 includes multiple mounting points 750 for affixation to cartridge 610.

FIG. 8 is a back view of a cartridge 610 for a magazine in accordance with an illustrative embodiment, and corresponds with view arrows 8 of FIG. 6. FIG. 8 illustrates that cartridge 610 comprises a plate 800. Serpentine channel 810 traverses through plate 800, and collars travel (i.e., are progressed through the cartridge 610) through serpentine channel 810 in the indicated directions when they are driven (e.g., pneumatically, via gravity, via magnetic motivation, etc.) based on instructions provided by a computer system (e.g., computer system 160 of FIG. 1). While serpentine channel 810 may comprise any suitable shape, in this embodiment the serpentine channel 810 forms a spiral shape 870 having rotational symmetry. Serpentine channel 810 stores collars 880, which partially overlap and remain in the same orientation while traversing serpentine channel 810. Furthermore, serpentine channel 810 and provides a route for collars to follow as they proceed towards a swage tool. Serpentine channel 810 includes entrance 820 and exit 830 disposed at side 860 of plate 800. When multiple cartridges 610 are stacked together as shown in FIG. 6, the plate 800 of a cartridge 610 will cover a serpentine channel 810 of another cartridge 610. This prevents collars from falling out of serpentine channel (i.e., from falling in a direction out of the page). A last of the cartridges 610 is protected by cover 700 of FIG. 7. Mounting points 850, which align with mounting points 750 of FIG. 7, are also depicted Serpentine channel 810 is dimensioned to have a height and turn radius that will accommodate progression/movement of collars of a known size through an expandable magazine 600 without jamming.

FIG. 8 also depicts cylinder 890. Cylinder 890 is placed behind the last collar being transported through serpentine channel 810. Cylinder 890 may comprise a solid cylinder dimensioned closely to the cross-section of serpentine channel 810. Cylinder 890 may therefore receive pressurized air from a pneumatic system more readily than a collar 880. Furthermore, to facilitate visual tracking, a face of cartridge 610 may be made transparent, and cylinder 890 may be provided with a distinctive color and/or be fluorescent coated. would, which facilitates pushing collars 880 in accordance with the arrows of FIG. 8. Cylinder 890 may further be embedded with a magnet or Radio Frequency Identifier (RFID) chip, whose presence may be detected as cylinder 890 progresses through serpentine channel 810. In this manner, the location of cylinder 890 may be detected and used to determine a number of collars left within an expandable magazine 600. Cylinder 890 may be blocked from traveling to a tool via a gate or other mechanism that physically prevents the passage of cylinder 890. In further embodiments, a gate may be implemented as a magnetic device that prevents non-magnetic or highly magnetic versions of cylinder 890 from passing through.

FIG. 9 is a cut-through view of a cartridge 610 in accordance with an illustrative embodiment, and corresponds with view arrows 9 of FIG. 8. FIG. 9 illustrates side walls 910 of serpentine channel 810, which provide serpentine channel 810 with a width W and a depth D. In this embodiment, serpentine channel 810 is unenclosed in cross-section. That is, the top of the serpentine channel 810 is exposed and the serpentine channel 810 is therefore open. While a cross-section of serpentine channel 810 is shown as u-shaped in this embodiment, in further embodiments serpentine channel 810 has a cross section of varying width along its height. Although cartridge 610 is sized for a specific size of collar (e.g., flanged/unflanged collar of ³⁄₁₆", ¼", or ⅜" size), multiple different ones of cartridges 610 may have channels that are dimensioned to each facilitate transfer of a different size of collar. That is, serpentine channel 810 for a cartridge 610 is dimensioned/sized for a specific size of lockbolt collar, although in some embodiments the serpentine channel 810 may be dimensioned to transport multiple different sizes of lockbolt collars. Using a different cartridge for each size of collar ensures that collars of the wrong size are not accidentally loaded into a cartridge. In further embodiments, a cartridge may be sized to transport multiple sizes of collar, so long as the amount of resulting air leakage is within desired parameters. However, in practice, each cartridge 610 within an expandable magazine 600 is loaded with same size and same type of lockbolt collar, to ensure that lockbolt collars of a uniform size are provided to the swage tool.

FIG. 10 is a zoomed in view of a cross section of a serpentine channel 810 in an illustrative embodiment, and corresponds with region 10 of FIG. 9. In many embodiments, the cross section of serpentine channel 810 may comprise a square tube dimensioned such that collars cannot change orientation as they are transported. However, in this embodiment, side walls 910 of serpentine channel 810 include prongs 1010. Prongs 1010 reduce a diameter of a portion 1062 of the serpentine channel 810 to D2, which is less wide than a diameter (D1) of a circumferential flange 1054 on a collar 1050, but may be equal to or wider than a diameter of a body 1052 of the collar 1050. Thus, in this embodiment, the collars 1050 are arranged with the circumferential flange 1054 downward. This Prong 1010 help to stabilize the upper portion of the collar 1050 and prevent the collar 1050 from flipping over within serpentine channel 810. Collar 1050 is prevented from tipping sideways (i.e., into or out of the page) by neighboring collars positioned into and out of the page. Furthermore, the proximity of the prongs 1010 to the bottom of the serpentine channel 810 may be selected to prevent collar 1050 from tipping over. Serpentine channel 810 also includes grooves 1020 defined by prongs 1010 and the side walls 910 of-the serpentine channel 810. Grooves 1020 are contiguous with serpentine channel 810 channel and correspond with the diameter of the circumferential flange 1054. This combination of prongs 1010 and grooves 1020 at serpentine channel 810 prevents the collars 1050 from being loaded into the second cartridge if the collars 1050 are upside-down, because in such a circumstance the prongs 1010 physically interfere with circumferential flanges 1054. The cross-sectional features illustrated in FIG. 10 may be implemented at an entrance of serpentine channel 810, an exit of serpentine channel 810, throughout serpentine channel 810, etc. In this embodiment, serpentine channel 810 is dimensioned to leave a gap G between collar 1050 and an upper boundary 1070 of serpentine channel 810. Gap G is larger than a thickness T of circumferential flange 1054. This enables collar 1050 to move vertically up and down in a manner that enables circumferential flange 1054 to overlap with other circumferential flanges of other collars within serpentine channel 810.

With cartridges discussed above, further discussion focuses upon connectors which couple serpentine channels of cartridges together in order to form a continuous passageway.

FIG. 11 is a back view of a connector 1100 for a magazine in accordance with an illustrative embodiment, and corresponds with view arrows 11 of FIG. 6. Connector 1100 includes a passageway 1110 through which collars may travel in direction 1112. If no other connectors are adjacent to connector 1100, then collars may enter or exit via opening 1120 or opening 1130. However, if two of connectors 1100 are adjacent, then one of connectors 1100 may block opening 1120 and opening 1130 of another of connectors 1100, preventing collars from exiting via the openings. This ensures that collars continue into or out of the page, traveling through cartridges of a magazine until an end of the magazine is reached. Once the end of the magazine is reached, collars may exit via opening 1120 or 1130 as desired and proceed towards a swage tool.

FIG. 13 illustrates an exit port 650 for a magazine in accordance with an illustrative embodiment, and corresponds with view arrows 13 of FIG. 6. In FIG. 13, a sliding cover 1310 is biased by biasing device 1320 (e.g., a spring) to cover exit port 650. This prevents collars from falling out of expandable magazine 600 when expandable magazine 600 is not connected to a swage tool.

Illustrative details of the operation of expandable magazine 600 will be discussed with regard to FIG. 14. Assume, for this embodiment, that an operator wishes to assemble an expandable magazine having a predetermined number of collars, in order to provide collars to a swage tool (e.g., offset swage assembly 310) while the swage tool operates in accordance with a Numerical Control (NC) program. A number of cartridges to include in the expandable magazine may be determined by dividing a desired capacity of the magazine by a collar capacity of an individual cartridge, and rounding up. By stacking cartridges together to form the expandable magazine, a capacity of the expandable magazine is increased.

FIG. 14 is a flowchart illustrating a method 1400 for assembling an expandable magazine that includes multiple cartridges coupled via connectors in an illustrative embodiment. The steps of method 1400 are described with reference to expandable magazine 600 of FIG. 6, but those skilled in the art will appreciate that method 1400 may be performed in other systems. The steps of the flowcharts described herein are not all inclusive and may include other steps not shown. The steps described herein may also be performed in an alternative order.

Step 1402 comprises selecting a first of the cartridges 610 that comprises a plate 800 having a first serpentine channel (e.g., serpentine channel 810) dimensioned for conveying collars through the plate 800, and further comprising an entrance 820 and an exit 830 of the first serpentine channel disposed at a side of the plate 800. Step 1403 comprises disposing the cartridge 610 at a swage tool.

Step 1404 includes stacking a second of the cartridges 610, comprising a copy of the first cartridge, with the first cartridge such that a plate 800 of the second cartridge covers the plate 800 of the first cartridge. Stacking the second cartridge with the first cartridge covers the serpentine channel 810 of the first cartridge, preventing collars from falling out of the first cartridge.

In step 1406, the method includes identifying an entrance of the first serpentine channel, and in step 1408, the method includes identifying an exit of a second serpentine channel of the second cartridge.

Step 1410 includes selecting a connector that defines a passageway between the entrance of the first serpentine channel and the exit of the second serpentine channel, and step 1412 comprises forming a continuous passageway for collars to travel through the first serpentine channel to the second serpentine channel by affixing the connector to the first cartridge (e.g., at an exit) and the second cartridge (e.g., at an entrance).

Steps 1404-1410 may be repeated any number of times as desired to integrate additional cartridges into the expandable magazine 600 until a desired size has been reached. A final cartridge that was stacked may then have its serpentine channel enclosed by affixing cover 700 thereupon. In this manner, expandable magazine 600 may have an expandable capacity of lockbolt collars as per the automation region, in which the swage tool will be used. While the number of lockbolt collars will vary, the size of the lockbolt collars within an expandable magazine 600 will not. The transfer tube arrangement resulting from use of connectors 620 allows unlimited capacity expansion of the expandable magazine 600.

After the desired size has been reached, the expandable magazine 600 is loaded with collars and attached to a swage tool. The collars are then fed via pneumatic pressure to a swage tool. Method 1400 therefore provides a substantial technical benefit by enabling a swage tool to be loaded with a desired number of collars needed for a given course or set of fasteners. By implementing a magazine of adjustable size, method 1400 also help to facilitate use of a swage tool in low clearance environments.

In further embodiments the method includes selecting a number of cartridges, and stacking the number of cartridges together with a first cartridge, a second cartridge, and a third cartridge. In further embodiments, the method includes loading every cartridge in the magazine with lockbolt collars of a same size. In further embodiments, the serpentine channel is dimensioned to transport multiple sizes of lockbolt collars. In further embodiments, the magazine is one of multiple magazines coupled with a swaging tool, wherein each of the magazines carries lockbolt collars of a different size.

Additional FIGS. depicted herein illustrate additional components which may be integrated into an expandable magazine in illustrative embodiments. FIG. 15 is a cut-through view of a collar flip device in an illustrative embodiment. Collar flip device 1500 may be utilized, for example, when an ejector provides collars in an orientation wherein a center hole vector (e.g., central axis) of the collar is parallel with a length of the passageway that the collar is being transported in. Collar flip device 1500 may be integrated into a continuous passageway of a magazine in order to adjust an orientation of collars 1550 traveling through the magazine. In this embodiment, collar flip device 1500 includes body 1510. When a collar 1550 proceeds from right to left within passageway 1520 (e.g., a passageway having a round/circular cross-section) as indicated by the arrow, the collar 1550 strikes notch 1542, slides along (e.g., is guided by) contoured portion 1530, and changes orientation by ninety degrees. The collar 1550, upon reaching passageway 1540 (e.g., a passageway having a square or notched cross-section), is driven by pneumatic pressure along passageway 1540 in the new orientation. Although illustrated for flanged collars, collar flip device 1500 may also be utilized for non-flanged collars. Collar flip device 1500 may also be snapped or latched into place, such that collar flip device 1500 may be replaced with another collar flip device sized for a different set of collars. In this embodiment, collar flip device 1500 is dimensioned to accommodate any of ¼", ⁵⁄₁₆", and/or ⅜" collars.

FIGS. 16-17 are perspective views of a collar injector 1600 in accordance with an illustrative embodiment. For example, collar injector 1600 may be a version of collar injector 512. Collar injector 1600 is designed to cause one collar at a time to be fed to a swage tool. The collar injector 1600 includes body 1610 and tube 1620 for delivering collars to a swage tool.

Figure 18:
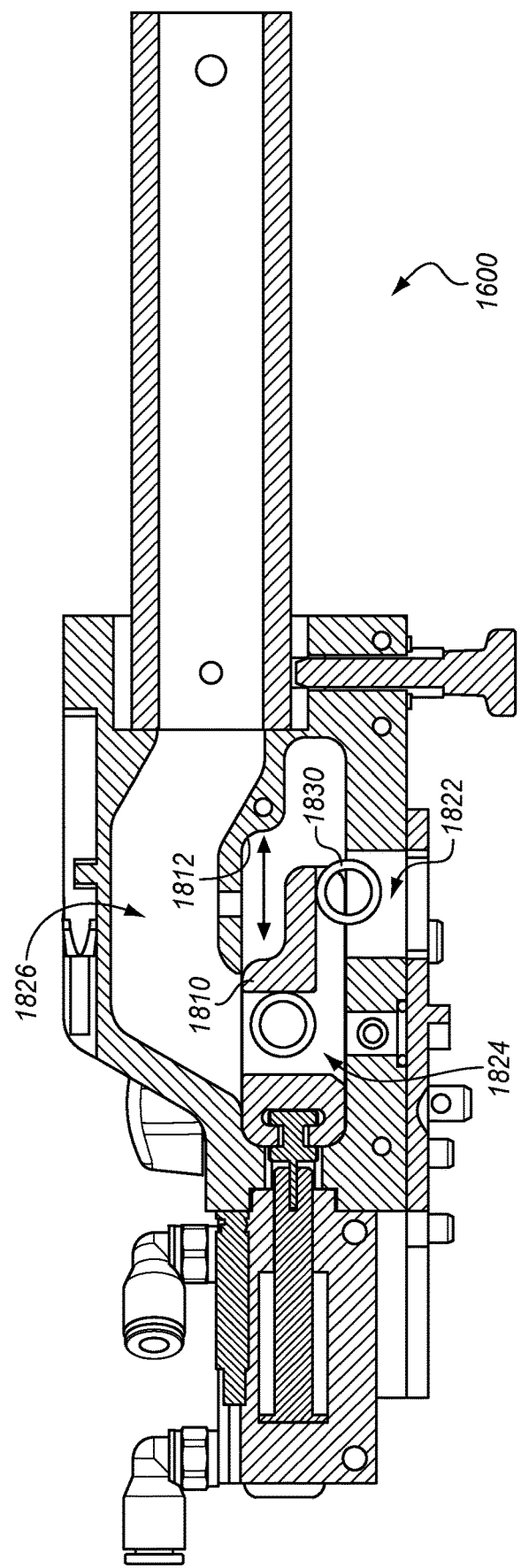
FIG. 18 is a cut-through view of a collar injector in accordance with an illustrative embodiment.

FIG. 18 is a cut-through view of a collar injector in accordance with an illustrative embodiment, and corresponds with view arrows 18 of FIG. 17. As shown in FIG. 18, collar injector 1600 receives collars 1830 via entrance 1822. A collar is held at entrance 1822 while slider 1810 is driven to the left (as shown in FIG. 18). When slider 1810 is driven to the right (e.g., by an actuator) against contour 1812, the collar 1830 enters chamber 1824. Slider 1810 may then be driven to the left, physically preventing new collars from entering while also driving the collar 1830 in chamber 1824 into chamber 1826. While in chamber 1826, the collar 1830 is pneumatically driven to the swage tool for use in a fastener.

Figure 19:
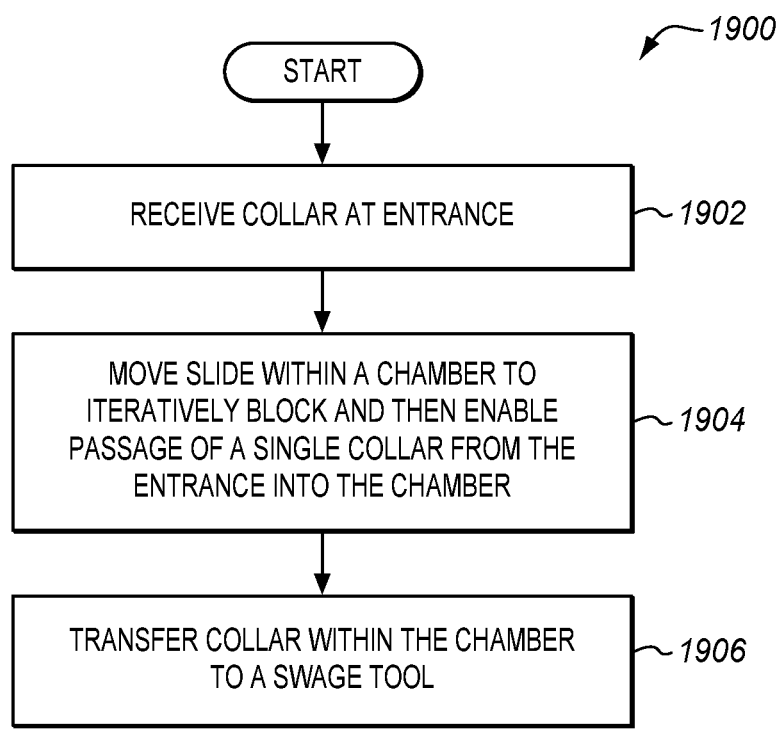
FIG. 19 is a flowchart illustrating a method for operating a collar injector in accordance with an illustrative embodiment.

FIG. 19 is a flowchart illustrating a method of operating a collar injector in an illustrative embodiment. According to FIG. 19, collar injector 1600 receives collars at entrance 1822 in step 1902. Slider 1810 moves within chamber 1824 to iteratively block and then enable passage of a single collar into chamber 1824 in step 1904. Collars in chamber 1824 are transferred to a swage tool via chamber 1826 in step 1906.

Figure 20:
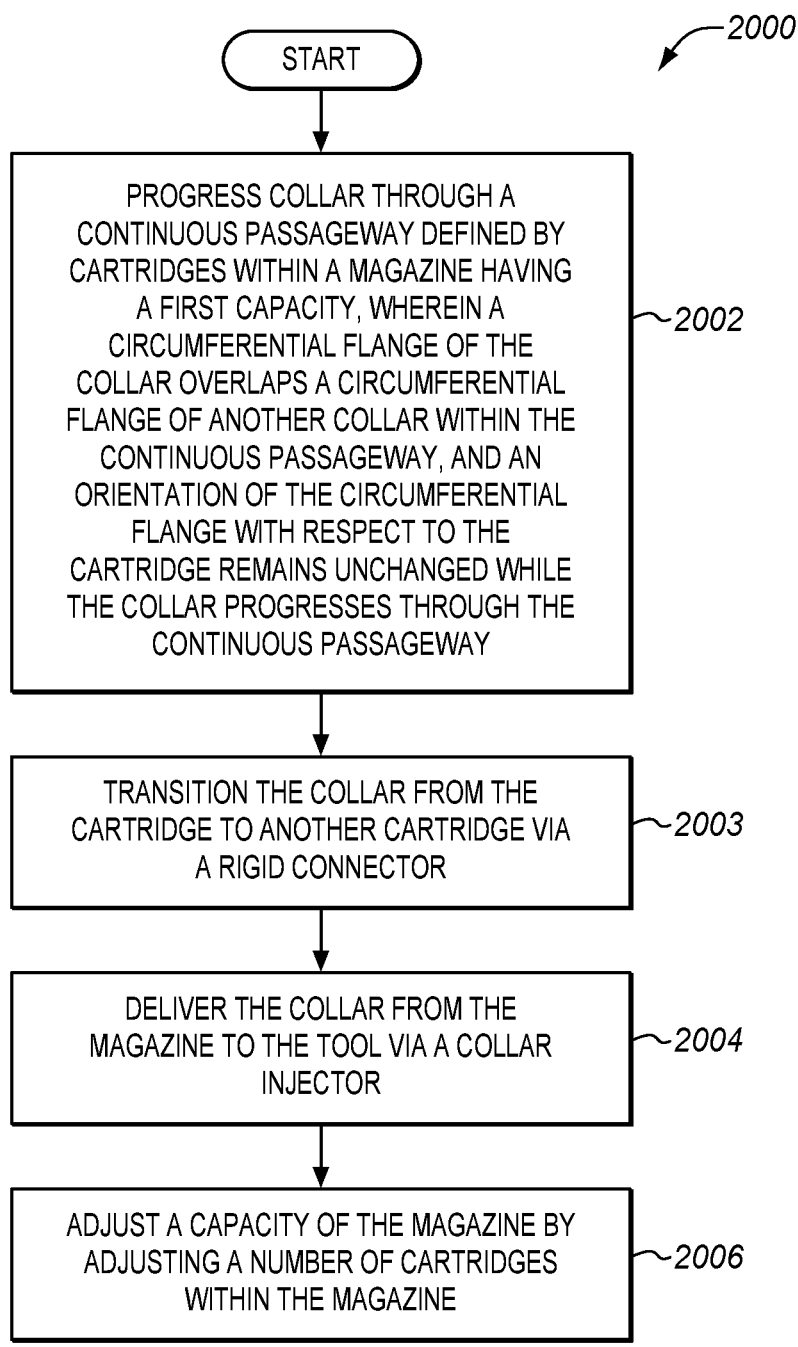
FIG. 20 is a flowchart illustrating a method for managing collar delivery in accordance with an illustrative embodiment.

FIG. 20 is a flowchart illustrating a method for managing collar delivery in accordance with an illustrative embodiment. As shown in FIG. 20, step 2002 includes progressing a collar through a continuous passageway defined by a cartridge within a magazine having a first capacity. A circumferential flange of the collar overlaps a circumferential flange of another collar within the continuous passageway, and an orientation of the circumferential flange with respect to the cartridge remains unchanged while the collar progresses through the continuous passageway. Step 2003 includes transitioning the collar from the cartridge to another cartridge within the magazine via a rigid connector, and step 2004 includes delivering the collar from the magazine to the tool via a collar injector. In step 2006, a capacity of the magazine is adjusted by adjusting a number of cartridges within the magazine.

EXAMPLES

In the following examples, additional processes, systems, and methods are described in the context of an expandable magazine for a swage tool.

Figure 21:
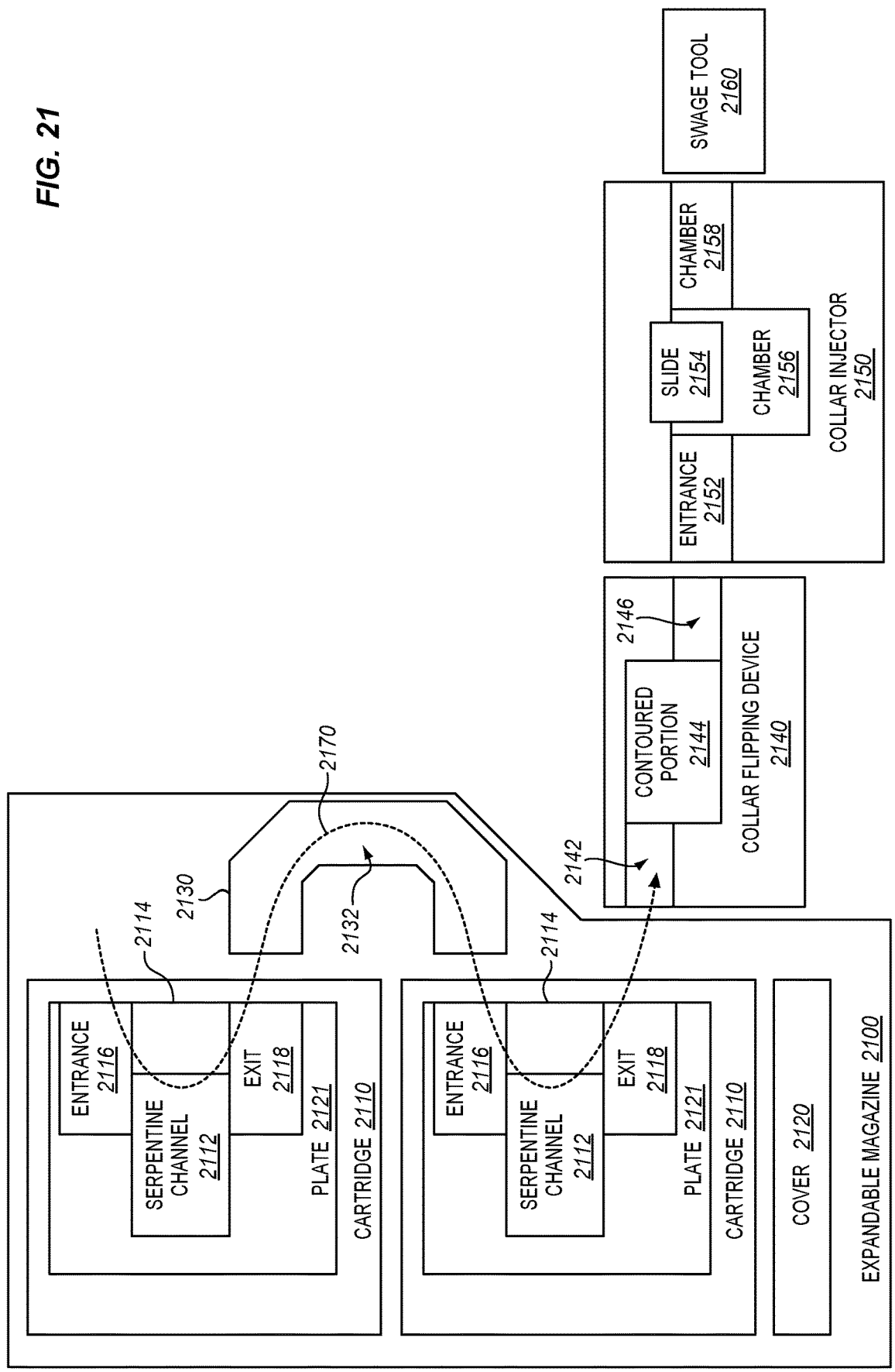
FIG. 21 is a block diagram of an expandable magazine in an illustrative embodiment.

FIG. 21 is a block diagram of an expandable magazine 2100 in an illustrative embodiment. FIG. 21 depicts expandable magazine 2100 as including multiple cartridges 2110. Each cartridge 2110 includes a plate 2121 having a serpentine channel 2112 with an entrance 2116 and an exit 2118. Both the entrance 2116 and the exit 2118 are disposed at a side 2114 of the plate 2121. Connector 2130 couples cartridges 2110 together, and includes passageway 2132 which links entrances to exits between cartridges, resulting in a continuous passageway 2170 comprising entrance 2116, serpentine channel 2112, exit 2118, passageway 2132, and another entrance 2116, serpentine channel 2112, and exit 2118.

Cover 2120 prevents collars from falling out of a serpentine channel 2112 Collar flipping device 2140 includes passageway 2142, contoured portion 2144 which flips incoming collars, and passageway 2146. Collar injector 2150 receives collars from collar flipping device 2140 at entrance 2152. Slide 2154 moves within chamber 2156 to iteratively block and then enable passage of a single collar into chamber 2158. Collars in chamber 2158 are transferred to swage tool 2160 for swaging to install a fastener.

Figure 22:
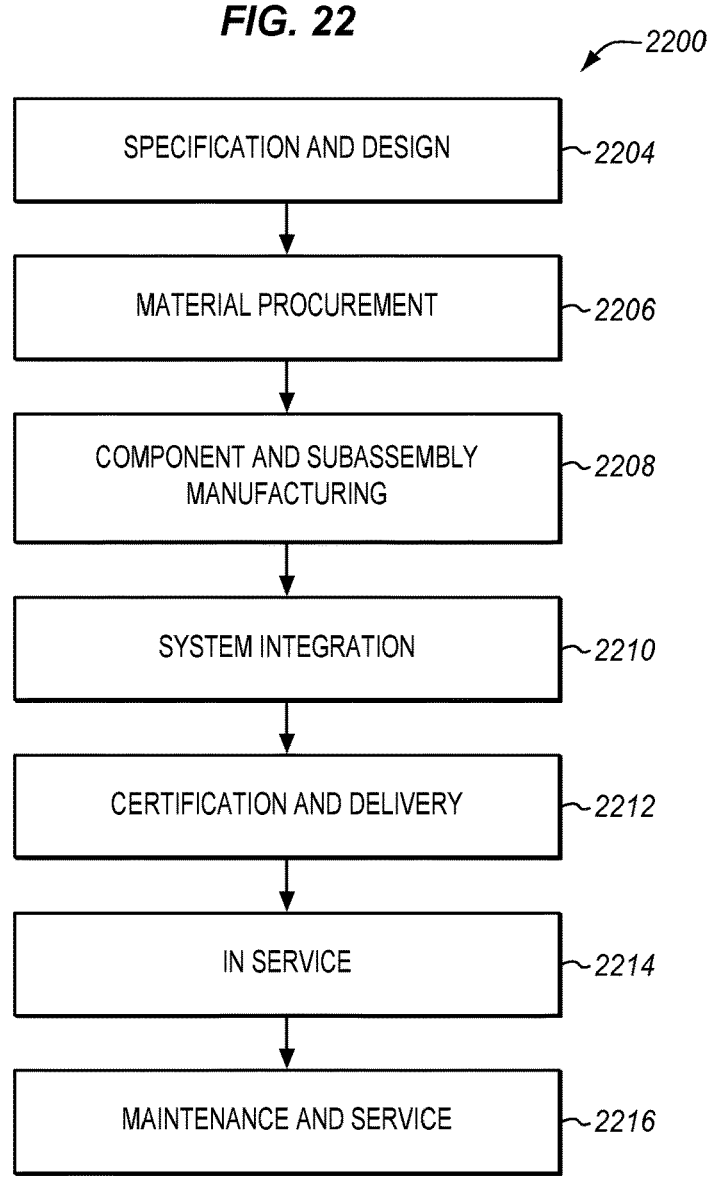
FIG. 22 is a flow diagram of aircraft production and service methodology in an illustrative embodiment.
Figure 23:
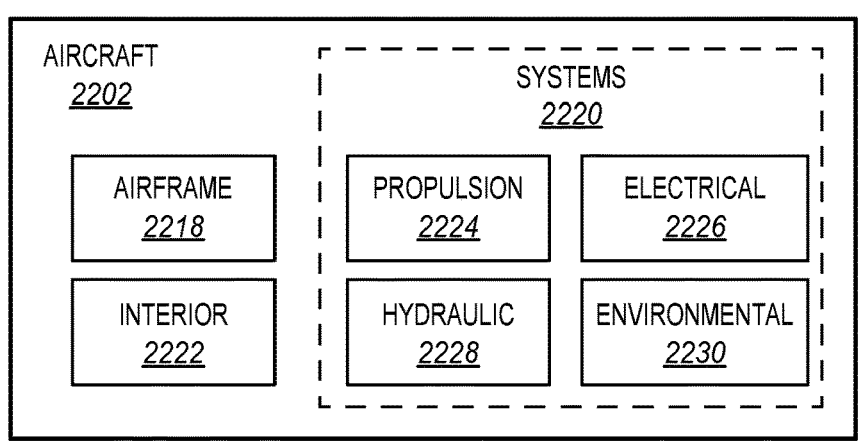
FIG. 23 is a block diagram of an aircraft in an illustrative embodiment.

Referring more particularly to the drawings, embodiments of the disclosure may be described in the context of aircraft manufacturing and service in method 2200 as shown in FIG. 22 and an aircraft 2202 as shown in FIG. 23. During pre-production, method 2200 may include specification and design 2204 of the aircraft 2202 and material procurement 2206. During production, component and subassembly manufacturing 2208 and system integration 2210 of the aircraft 2202 takes place. Thereafter, the aircraft 2202 may go through certification and delivery 2212 in order to be placed in service 2214. While in service by a customer, the aircraft 2202 is scheduled for routine work in maintenance and service 2216 (which may also include modification, reconfiguration, refurbishment, and so on). Apparatus and methods embodied herein may be employed during any one or more suitable stages of the production and service described in method 2200 (e.g., specification and design 2204, material procurement 2206, component and subassembly manufacturing 2208, system integration 2210, certification and delivery 2212, service 2214, maintenance and service 2216) and/or any suitable component of aircraft 2202 (e.g., airframe 2218, systems 2220, interior 2222, propulsion system 2224, electrical system 2226, hydraulic system 2228, environmental 2230).

Each of the processes of method 2200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 23, the aircraft 2202 produced by method 2200 may include an airframe 2218 with a plurality of systems 2220 and an interior 2222. Examples of systems 2220 include one or more of a propulsion system 2224, an electrical system 2226, a hydraulic system 2228, and an environmental system 2230. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 2200. For example, components or subassemblies corresponding to component and subassembly manufacturing 2208 may be fabricated or manufactured in a manner similar to components or subassemblies produced while the aircraft 2202 is in service. Also, one or more apparatus embodiments, method embodiments, or a combination thereof may be utilized during the subassembly manufacturing 2208 and system integration 2210, for example, by substantially expediting assembly of or reducing the cost of an aircraft 2202. Similarly, one or more of apparatus embodiments, method embodiments, or a combination thereof may be utilized while the aircraft 2202 is in service, for example and without limitation during the maintenance and service 2216. For example, the techniques and systems described herein may be used for material procurement 2206, component and subassembly manufacturing 2208, system integration 2210, service 2214, and/or maintenance and service 2216, and/or may be used for airframe 2218 and/or interior 2222. These techniques and systems may even be utilized for systems 2220, including, for example, propulsion system 2224, electrical system 2226, hydraulic 2228, and/or environmental system 2230.

In one embodiment, a part comprises a portion of airframe 2218, and is manufactured during component and subassembly manufacturing 2208. The part may then be assembled into an aircraft in system integration 2210, and then be utilized in service 2214 until wear renders the part unusable. Then, in maintenance and service 2216, the part may be discarded and replaced with a newly manufactured part. Inventive components and methods may be utilized throughout component and subassembly manufacturing 2208 in order to install fasteners into new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for assembling a magazine for a swage tool, the method comprising:
   selecting a cartridge that comprises a first serpentine channel dimensioned for conveying collars, and further comprises an entrance and an exit of the first serpentine channel; and
   disposing the cartridge at a swage tool.

2. The method of claim 1 wherein:
   the cartridge is a first cartridge, and the method further comprises:
   stacking a second cartridge, comprising a copy of the first cartridge, with the first cartridge such that the second cartridge covers the first cartridge.

3. The method of claim 2 further comprising:
   identifying an entrance of the first serpentine channel;
   identifying an exit of a second serpentine channel of the second cartridge;
   selecting a connector that defines a passageway between the entrance of the first serpentine channel and the exit of the second serpentine channel; and
   forming a continuous passageway for collars to travel through the first serpentine channel to the second serpentine channel by affixing the connector to the first cartridge and the second cartridge.

4. The method of claim 3 further comprising:
   stacking a third cartridge, comprising a copy of the second cartridge, with the second cartridge such that the third cartridge covers the second cartridge;
   identifying an entrance of the second serpentine channel;
   identifying an exit of a third serpentine channel of the third cartridge;
   selecting an additional connector that defines a passageway between the entrance of the second serpentine channel and the exit of the third serpentine channel; and
   extending the continuous passageway for collars to travel through the second serpentine channel to the third serpentine channel by affixing the additional connector to the second cartridge and the third cartridge.

5. The method of claim 4 further comprising:
   selecting a number of cartridges; and
   stacking the number of cartridges together with the first cartridge, second cartridge, and third cartridge.

6. The method of claim 5 further comprising:
   loading every cartridge in the magazine with lockbolt collars of a same size.

7. The method of claim 1 wherein:
   the serpentine channel is dimensioned to transport multiple sizes of lockbolt collars.

8. The method of claim 1 wherein:
   the magazine is one of multiple magazines coupled with a swaging tool, wherein each of the magazines carries lockbolt collars of a different size.

9. A portion of an aircraft assembled according to the method of claim 1.

10. A non-transitory computer readable medium embodying programmed instructions which, when executed by a processor, that perform a method for assembling a collar delivery device for a swage tool, the method comprising:
    selecting a cartridge that comprises a first serpentine channel dimensioned for conveying collars, and further comprises an entrance and an exit of the first serpentine channel; and
    disposing the cartridge at a swage tool.

11. A portion of an aircraft assembled according to the method defined by the instructions stored on the computer readable medium of claim 10.

12. An apparatus for delivering collars to a swage tool, the apparatus comprising:
    a first cartridge that comprises a first serpentine channel dimensioned for conveying collars, and that further comprises an entrance and an exit of the first serpentine channel; and
    a collar injector that delivers collars from the first serpentine channel one at a time to the swage tool.

13. The apparatus of claim 12 further comprising:
    a second cartridge, comprising a copy of the cartridge, stacked with the cartridge such that the second cartridge covers the cartridge; and
    a connector that defines a passageway between the entrance of the first serpentine channel and an exit of a second serpentine channel, and that forms a continuous passageway for collars to travel through the first serpentine channel to the second serpentine channel.

14. The apparatus of claim 13 further comprising:
    a third cartridge, comprising a copy of the second cartridge, stacked with the second cartridge such that the third cartridge covers the second cartridge; and
    an additional connector that defines a passageway between the entrance of the second serpentine channel and an exit of a third serpentine channel of the third cartridge, enabling collars to travel through the second serpentine channel to the third serpentine channel.

15. The apparatus of claim 12 wherein:
    the first serpentine channel forms a shape having rotational symmetry.

16. Fabricating a portion of an aircraft using the apparatus of claim 12.

17. A method for managing collar delivery to a tool, the method comprising:
- progressing a collar through a continuous passageway defined by a cartridge within a magazine having a first capacity, wherein a circumferential flange of the collar overlaps a circumferential flange of another collar within the continuous passageway, and an orientation of the circumferential flange with respect to the cartridge remains unchanged while the collar progresses through the continuous passageway;
- transitioning the collar from the cartridge to another cartridge within the magazine via a rigid connector;
- delivering the collar from the magazine to the tool via a collar injector; and
- adjusting a capacity of the magazine by adjusting a number of cartridges within the magazine.

18. The method of claim 17 further comprising:
adjusting an orientation of the collar in response to a flange at the collar striking a protrusion at a collar flip device.

19. The method of claim 17 wherein:
progressing the collar is performed in response to airflow supplied to the magazine via a pneumatic line.

20. A portion of an aircraft assembled according to the method of claim 17.

* * * * *